United States Patent
Balassanian et al.

(10) Patent No.: US 12,170,075 B2
(45) Date of Patent: Dec. 17, 2024

(54) COMPARISON TRAINING FOR MUSIC GENERATOR

(71) Applicant: AiMi Inc., Littleton, CO (US)

(72) Inventors: Edward Balassanian, Austin, TX (US); Patrick E. Hutchings, Melbourne (AU); Toby Gifford, Melbourne (AU)

(73) Assignee: AiMi Inc., Littleton, CO (US)

( * ) Notice: Subject to any disclaimer, the term of this patent is extended or adjusted under 35 U.S.C. 154(b) by 657 days.

(21) Appl. No.: 17/408,076

(22) Filed: Aug. 20, 2021

(65) Prior Publication Data
US 2022/0059062 A1   Feb. 24, 2022

Related U.S. Application Data

(60) Provisional application No. 63/068,431, filed on Aug. 21, 2020, provisional application No. 63/068,433, (Continued)

(51) Int. Cl.
*G10H 1/00* (2006.01)
*G06N 20/00* (2019.01)
*G10H 1/053* (2006.01)

(52) U.S. Cl.
CPC .......... *G10H 1/0025* (2013.01); *G06N 20/00* (2019.01); *G10H 1/053* (2013.01);
(Continued)

(58) Field of Classification Search
CPC ............... G10H 1/0025; G10H 1/053; G10H 2210/031; G10H 2210/105;
(Continued)

(56) References Cited

U.S. PATENT DOCUMENTS

| | | | | |
|---|---|---|---|---|
| 6,051,770 A | * | 4/2000 | Milburn | G10H 1/00 84/610 |
| 8,269,092 B2 | * | 9/2012 | Terauchi | G10H 7/004 84/610 |

(Continued)

OTHER PUBLICATIONS

International Search Report and Written Opinion in PCT Appl. No. PCT/US2021/046658 mailed Nov. 18, 2021, 12 pages.
(Continued)

*Primary Examiner* — Christina M Schreiber
(74) *Attorney, Agent, or Firm* — Kowert, Hood, Munyon, Rankin & Goetzel, P.C.; Gareth M. Sampson; Dean M. Munyon

(57) ABSTRACT

Techniques are disclosed relating to automatically generating new music content based on image representations of audio files. A music generation system includes a music generation subsystem and a music classification subsystem. The music generation subsystem may generate output music content according to music parameters that define policy for generating music. The classification subsystem may be used to classify whether music is generated by the music generation subsystem or is professionally produced music content. The music generation subsystem may implement an algorithm that is reinforced by prediction output from the music classification subsystem. Reinforcement may include tuning the music parameters to generate more human-like music content.

20 Claims, 11 Drawing Sheets

Related U.S. Application Data filed on Aug. 21, 2020, provisional application No. 63/068,436, filed on Aug. 21, 2020, provisional application No. 63/068,411, filed on Aug. 21, 2020, provisional application No. 63/068,415, filed on Aug. 21, 2020, provisional application No. 63/068,421, filed on Aug. 21, 2020, provisional application No. 63/068,426, filed on Aug. 21, 2020.

(52) U.S. Cl.
CPC . *G10H 2210/031* (2013.01); *G10H 2210/105* (2013.01); *G10H 2210/111* (2013.01); *G10H 2220/116* (2013.01); *G10H 2240/125* (2013.01); *G10H 2240/131* (2013.01); *G10H 2240/141* (2013.01); *G10H 2240/325* (2013.01)

(58) Field of Classification Search
CPC ........ G10H 2210/111; G10H 2250/116; G10H 2240/125; G10H 2240/131; G10H 2240/141; G10H 2240/325; G06N 20/00
USPC .......................................................... 84/609
See application file for complete search history.

(56) References Cited

U.S. PATENT DOCUMENTS

| | | | | |
|---|---|---|---|---|
| 11,947,864 | B2* | 4/2024 | Balassanian | G06F 21/16 |
| 2014/0052282 | A1* | 2/2014 | Balassanian | G10H 1/0025 |
| | | | | 700/94 |
| 2019/0362696 | A1* | 11/2019 | Balassanian | G10H 1/0025 |
| 2019/0374842 | A1* | 12/2019 | Guralnick | G06F 3/167 |
| | | | | 84/DIG. 12 |
| 2021/0027754 | A1* | 1/2021 | Balassanian | G06N 3/08 |
| 2021/0247954 | A1* | 8/2021 | Balassanian | G06N 3/044 |
| 2021/0247955 | A1* | 8/2021 | Balassanian | G06F 21/16 |
| 2021/0248213 | A1* | 8/2021 | Balassanian | G05B 15/02 |
| 2021/0248983 | A1* | 8/2021 | Balassanian | G06N 7/01 |
| 2022/0059062 | A1* | 2/2022 | Balassanian | G06N 3/042 |
| 2022/0059063 | A1* | 2/2022 | Balassanian | G06N 3/088 |

OTHER PUBLICATIONS

Smith, B. D., & Garnett, G. E. (Apr. 2012). Reinforcement learning and the creative, automated music improviser. In International Conference on Evolutionary and Biologically Inspired Music and Art (pp. 223-234). Springer, Berlin, Heidelberg.

Jaques et al., "Tuning recurrent neural networks with reinforcement learning," Under review as a conference paper at CLR 2017; arXiv:1611.02796v3 [cs.LG] Dec. 7, 2016; 12 pages.

Jaques et al., "Generating Music by Fine-Tuning Recurrent Neural Networks with Reinforcement Learning," Deep Reinforcement Learning Workshop, NIPS (2016), 11 pages.

Chi et al., "A Reinforcement Learning Approach to Emotion-based Automatic Playlist Generation," 2010 International Conference on Technologies and Applications of Artificial Intelligence, Nov. 18-20, 2010, IEEE, pp. 60-65.

Eghbal-Zadeh et al. "I-Vectors for Timbre-Based Music Similarity and Music Artist Classification," 16th International Society for Music Information Retrieval Conference (ISMIR) (Oct. 2015) pp. 554-560.

Tsiros et al., "Towards a Human-Centric Design Framework for AI Assisted Music Production," NIME, Jul. 21-25, 2020, pp. 399-404.

Choi et al., "Towards Playlist Generation Algorithms Using RNNs Trained on Within-Track Transitions*," arXiv:1606.02096v1 [cs.AI] Jun. 7, 2016; ACM ISBN 978-1-4503-2138-9, 4 pages.

Kitahara et al., "An interactive music composition system based on autonomous maintenance of musical consistency," Proc. Sound and Music Computing (2011), 7 pages.

Herremans et al., "MorpheuS: generating structured music with constrained patterns and tension," IEEE Transactions on Affective Computing (2017), 10(4), 510-523.

Fiebrink, "Real-time human interaction with supervised learning algorithms for music composition and performance," Princeton University, Jan. 2011, entire document.

* cited by examiner

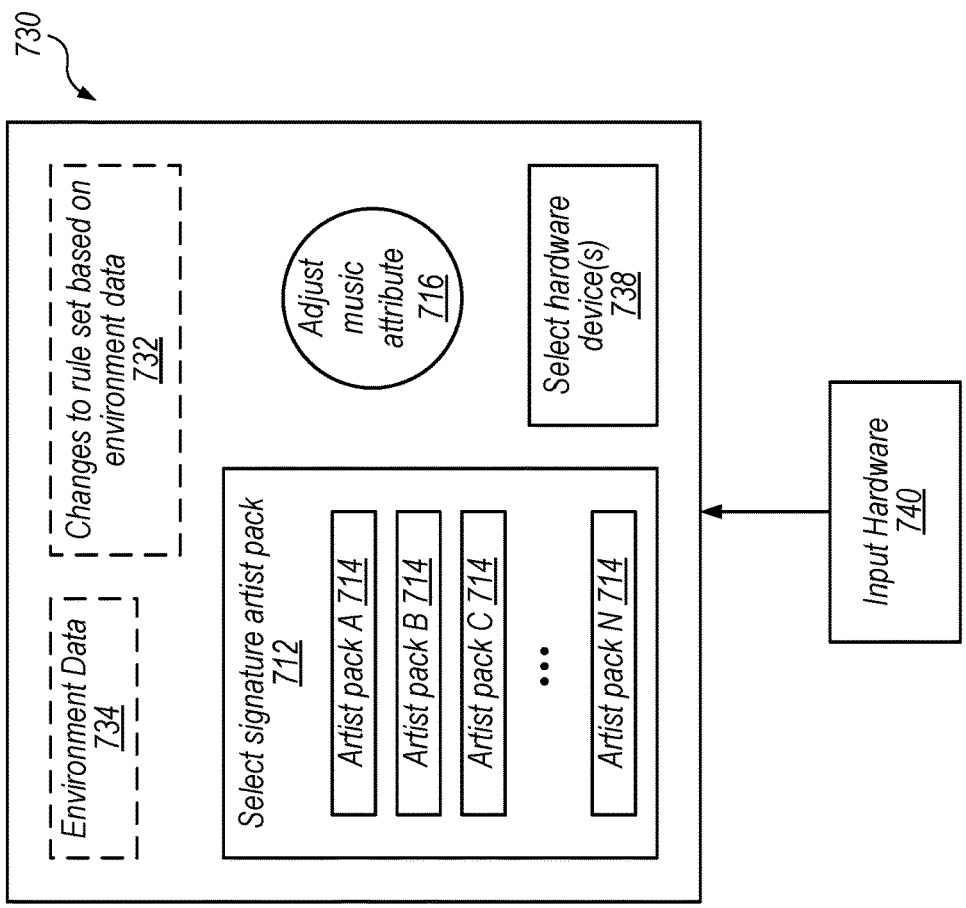
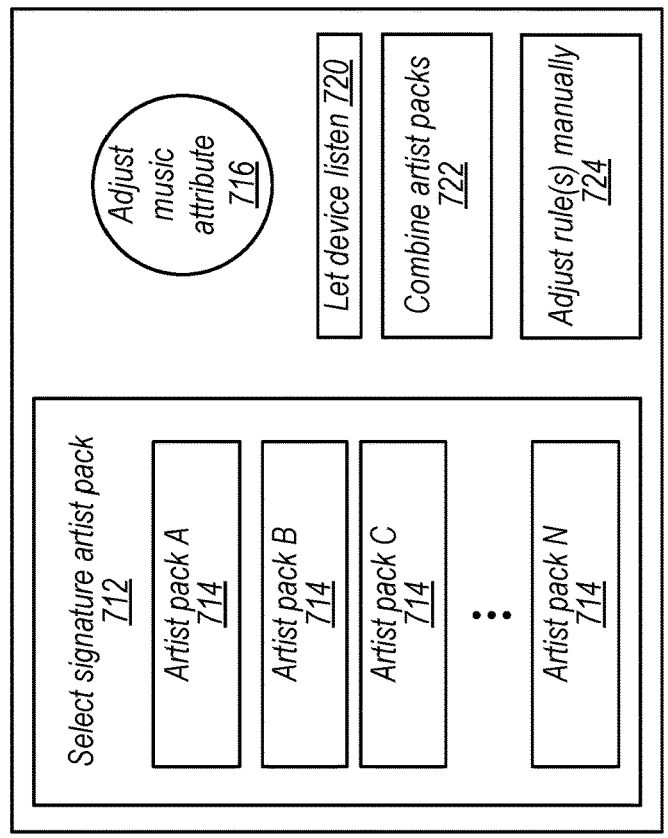
FIG. 7A
FIG. 7B

COMPARISON TRAINING FOR MUSIC GENERATOR

PRIORITY CLAIM

This application claims the benefit of U.S. Provisional Application No. 63/068,411, filed on Aug. 21, 2020; U.S. Provisional Application No. 63/068,415, filed Aug. 21, 2020; U.S. Provisional Application No. 63/068,421 filed Aug. 21, 2020; U.S. Provisional Application No. 63/068,426 filed Aug. 21, 2020; U.S. Provisional Application No. 63/068,431, filed Aug. 21, 2020; U.S. Provisional Application No. 63/068,433, filed Aug. 21, 2020; and U.S. Provisional Application No. 63/068,436 filed Aug. 21, 2020, each of which is incorporated by reference herein in its entirety.

BACKGROUND

Technical Field

This disclosure relates to audio engineering and more particularly to generating music content.

Description of the Related Art

Streaming music services typically provide songs to users via the Internet. Users may subscribe to these services and stream music through a web browser or application. Examples of such services include PANDORA, SPOTIFY, GROOVESHARK, etc. Often, a user can select a genre of music or specific artists to stream. Users can typically rate songs (e.g., using a star rating or a like/dislike system), and some music services may tailor which songs are streamed to a user based on previous ratings. The cost of running a streaming service (which may include paying royalties for each streamed song) is typically covered by user subscription costs and/or advertisements played between songs.

Song selection may be limited by licensing agreements and the number of songs written for a particular genre. Users may become tired of hearing the same songs in a particular genre. Further, these services may not tune music to users' tastes, environment, behavior, etc.

BRIEF DESCRIPTION OF THE DRAWINGS

FIGS. 7A-7B are block diagrams illustrating graphical user interfaces, according to some embodiments.

DETAILED DESCRIPTION

U.S. patent application Ser. No. 13/969,372, filed Aug. 16, 2013 (now U.S. Pat. No. 8,812,144), which is incorporated by reference herein in its entirety, discusses techniques for generating music content based on one or more musical attributes. To the extent that any interpretation is made based on a perceived conflict between definitions of the '372 application and the remainder of the disclosure, the present disclosure is intended to govern. The musical attributes may be input by a user or may be determined based on environment information such as ambient noise, lighting, etc. The '372 disclosure discusses techniques for selecting stored loops and/or tracks or generating new loops/tracks, and layering selected loops/tracks to generate output music content.

U.S. patent application Ser. No. 16/420,456, filed May 23, 2019 (now U.S. Pat. No. 10,679,596), which is incorporated by reference herein in its entirety, discusses techniques for generating music content. To the extent that any interpretation is made based on a perceived conflict between definitions of the '456 application and the remainder of the disclosure, the present disclosure is intended to govern. Music may be generated based on input by a user or using computer-implemented methods. The '456 disclosure discusses various music generator embodiments.

As used herein, the term "audio file" refers to sound information for music content. For instance, sound information may include data that describes music content in as raw audio in a format such as way, aiff, or FLAC. Properties of the music content may be included in the sound information. Properties may include, for example, quantifiable musical properties such as instrument classification, pitch transcription, beat timings, tempo, file length, and audio amplitude in multiple frequency bins. In some embodiments, an audio file includes sound information over a particular time interval. In various embodiments, audio files include loops. As used herein, the term "loop" refers to sound information for a single instrument over a particular time interval. Various techniques discussed with reference to audio files may also be performed using loops that include a single instrument. Audio files or loops may be played in a repeated manner (e.g., a 30 second audio file may be played four times in a row to generate 2 minutes of music content), but may also be played once, e.g., without being repeated.

Figure 1:
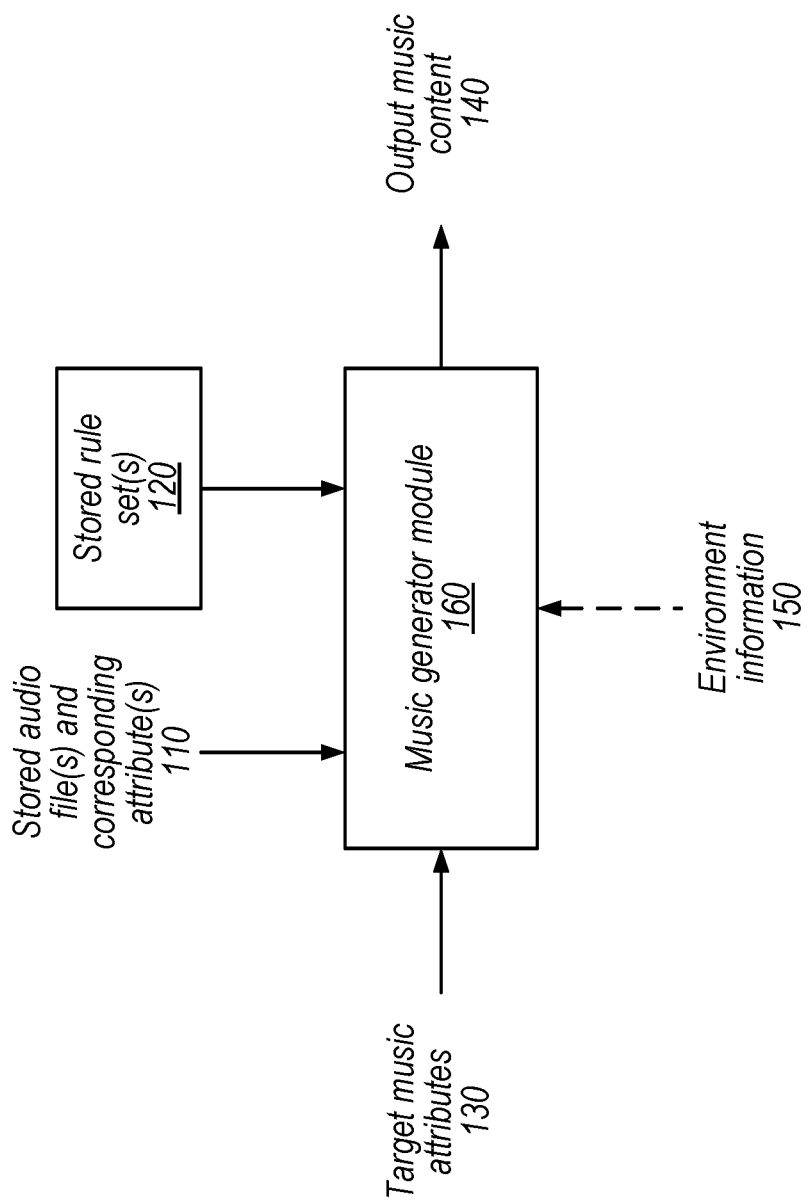
FIG. 1 is a diagram illustrating an exemplary music generator.
Figure 2:
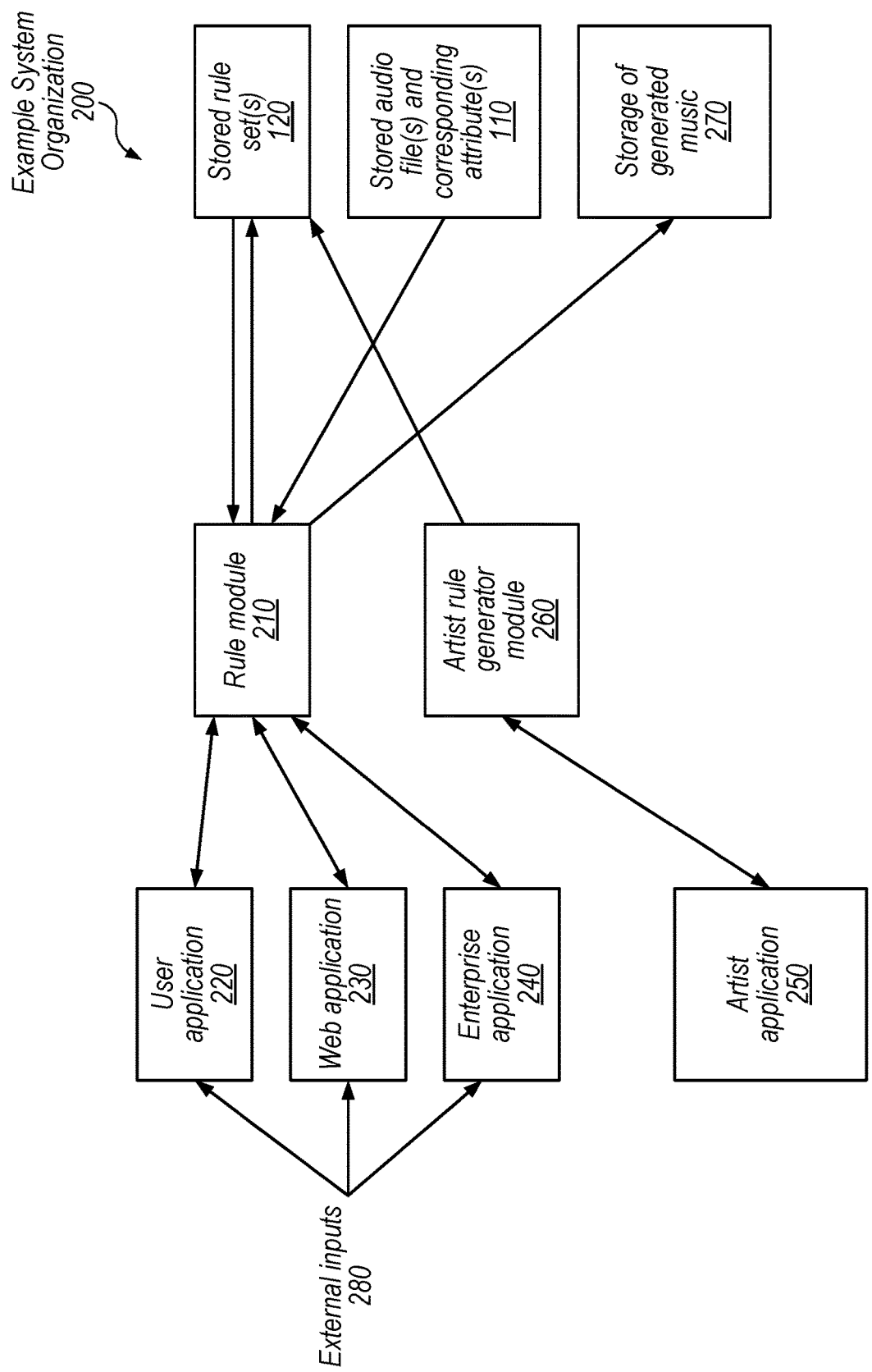
FIG. 2 is a block diagram illustrating an exemplary overview of a system for generating output music content based on inputs from multiple different sources, according to some embodiments.

This disclosure initially describes, with reference to FIGS. 1 and 2, an example music generator module and an overall system organization with multiple applications. Techniques for training a music generation system are discussed with reference to FIGS. 3-6. FIGS. 7A-7B show exemplary application interfaces.

In some embodiments, one or more classifiers are trained on a server system (e.g., in the cloud) while reinforcement learning is implemented on user devices to improve music generation. Disclosed techniques may advantageously allow customized user music generator modules based on a global classifier model used by multiple systems, reducing training time and cost and allowing for centralized training but personalized results.

Overview of Exemplary Music Generator

FIG. 1 is a diagram illustrating an exemplary music generator, according to some embodiments. In the illustrated embodiment, music generator module 160 receives various information from multiple different sources and generates output music content 140.

In the illustrated embodiment, module 160 accesses stored audio file(s) and corresponding attribute(s) 110 for the stored audio file(s) and combines the audio files to generate output music content 140. In some embodiments, music generator module 160 selects audio files based on their attributes and combines audio files based on target music attributes 130. In some embodiments, audio files may be selected based on environment information 150 in combination with target music attributes 130. In some embodiments, environment information 150 is used indirectly to determine target music attributes 130. In some embodiments, target music attributes 130 are explicitly specified by a user, e.g., by specifying a desired energy level, mood, multiple parameters, etc. For instance, listener-defined controls, described herein, may be implemented to specify listener preferences used as target music attributes. Examples of target music attributes 130 include energy, complexity, and variety, although more specific attributes (e.g., corresponding to the attributes of the stored tracks) may also be specified. Speaking generally, when higher-level target music attributes are specified, lower-level specific music attributes may be determined by the system before generating output music content.

Complexity may refer to the number of audio files, loops, and/or instruments that are included in a composition. Energy may be related to the other attributes or may be orthogonal to the other attributes. For example, changing keys or tempo may affect energy. However, for a given tempo and key, energy may be changed by adjusting instrument types (e.g., by adding high hats or white noise), complexity, volume, etc. Variety may refer to an amount of change in generated music over time. Variety may be generated for a static set of other musical attributes (e.g., by selecting different tracks for a given tempo and key) or may be generated by changing musical attributes over time (e.g., by changing tempos and keys more often when greater variety is desired). In some embodiments, the target music attributes may be thought of as existing in a multi-dimensional space and music generator module 160 may slowly move through that space, e.g., with course corrections, if needed, based on environmental changes and/or user input.

In some embodiments, the attributes stored with the audio files contain information about one or more audio files including: tempo, volume, energy, variety, spectrum, envelope, modulation, periodicity, rise and decay time, noise, artist, instrument, theme, etc. Note that, in some embodiments, audio files are partitioned such that a set of one or more audio files is specific to a particular audio file type (e.g., one instrument or one type of instrument).

In the illustrated embodiment, module 160 accesses stored rule set(s) 120. Stored rule set(s) 120, in some embodiments, specify rules for how many audio files to overlay such that they are played at the same time (which may correspond to the complexity of the output music), which major/minor key progressions to use when transitioning between audio files or musical phrases, which instruments to be used together (e.g., instruments with an affinity for one another), etc. to achieve the target music attributes.

Said another way, the music generator module 160 uses stored rule set(s) 120 to achieve one or more declarative goals defined by the target music attributes (and/or target environment information). In some embodiments, music generator module 160 includes one or more pseudo-random number generators configured to introduce pseudo-randomness to avoid repetitive output music.

Environment information 150, in some embodiments, includes one or more of: lighting information, ambient noise, user information (facial expressions, body posture, activity level, movement, skin temperature, performance of certain activities, clothing types, etc.), temperature information, purchase activity in an area, time of day, day of the week, time of year, number of people present, weather status, etc. In some embodiments, music generator module 160 does not receive/process environment information. In some embodiments, environment information 150 is received by another module that determines target music attributes 130 based on the environment information. Target music attributes 130 may also be derived based on other types of content, e.g., video data. In some embodiments, environment information is used to adjust one or more stored rule set(s) 120, e.g., to achieve one or more environment goals. Similarly, the music generator may use environment information to adjust stored attributes for one or more audio files, e.g., to indicate target musical attributes or target audience characteristics for which those audio files are particularly relevant.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

As used herein, the phrase "music content" refers both to music itself (the audible representation of music), as well as to information usable to play music. Thus, a song recorded as a file on a storage medium (such as, without limitation a compact disc, flash drive, etc.) is an example of music content; the sounds produced by outputting this recorded file or other electronic representation (e.g., through speakers) is also an example of music content.

The term "music" includes its well-understood meaning, including sounds generated by musical instruments as well as vocal sounds. Thus, music includes, for example, instrumental performances or recordings, a cappella performances or recordings, and performances or recordings that include both instruments and voice. One of ordinary skill in the art would recognize that "music" does not encompass all vocal recordings. Works that do not include musical attributes such as rhythm or rhyme—for example, speeches, newscasts, and audiobooks—are not music.

One piece of music "content" can be distinguished from another piece of music content in any suitable fashion. For example, a digital file corresponding to a first song may represent a first piece of music content, while a digital file corresponding to a second song may represent a second piece of music content. The phrase "music content" can also be used to distinguish particular intervals within a given musical work, such that different portions of the same song can be considered different pieces of musical content. Similarly, different tracks (e.g., piano track, guitar track) within a given musical work may also correspond to different pieces of musical content. In the context of a potentially endless stream of generated music, the phrase "music content" can be used to refer to some portion of the stream (e.g., a few measures or a few minutes).

Music content generated by embodiments of the present disclosure may be "new music content"—combinations of musical elements that have never been previously generated. A related (but more expansive) concept—"original music content"—is described further below. To facilitate the explanation of this term, the concept of a "controlling entity" relative to an instance of music content generation is described. Unlike the phrase "original music content," the phrase "new music content" does not refer to the concept of a controlling entity. Accordingly, new music content refers to music content that has never before been generated by any entity or computer system.

Conceptually, the present disclosure refers to some "entity" as controlling a particular instance of computer-generated music content. Such an entity owns any legal rights (e.g., copyright) that might correspond to the computer-generated content (to the extent that any such rights may actually exist). In one embodiment, an individual that creates (e.g., codes various software routines) a computer-implemented music generator or operates (e.g., supplies inputs to) a particular instance of computer-implemented music generation will be the controlling entity. In other embodiments, a computer-implemented music generator may be created by a legal entity (e.g., a corporation or other business organization), such as in the form of a software product, computer system, or computing device. In some instances, such a computer-implemented music generator may be deployed to many clients. Depending on the terms of a license associated with the distribution of this music generator, the controlling entity may be the creator, the distributor, or the clients in various instances. If there are no such explicit legal agreements, the controlling entity for a computer-implemented music generator is the entity facilitating (e.g., supplying inputs to and thereby operating) a particular instance of computer generation of music content.

Within the meaning of the present disclosure, computer generation of "original music content" by a controlling entity refers to 1) a combination of musical elements that has never been generated before, either by the controlling entity or anyone else, and 2) a combination of musical elements that has been generated before, but was generated in the first instance by the controlling entity. Content type 1) is referred to herein as "novel music content," and is similar to the definition of "new music content," except that the definition of "novel music content" refers to the concept of a "controlling entity," while the definition of "new music content" does not. Content type 2), on the other hand, is referred to herein as "proprietary music content." Note that the term "proprietary" in this context does not refer to any implied legal rights in the content (although such rights may exist), but is merely used to indicate that the music content was originally generated by the controlling entity. Accordingly, a controlling entity "re-generating" music content that was previously and originally generated by the controlling entity constitutes "generation of original music content" within the present disclosure. "Non-original music content" with respect to a particular controlling entity is music content that is not "original music content" for that controlling entity.

Some pieces of music content may include musical components from one or more other pieces of music content. Creating music content in this manner is referred to as "sampling" music content, and is common in certain musical works, and particularly in certain musical genres. Such music content is referred to herein as "music content with sampled components," "derivative music content," or using other similar terms. In contrast, music content that does not include sampled components is referred to herein as "music content without sampled components," "non-derivative music content," or using other similar terms.

In applying these terms, it is noted that if any particular music content is reduced to a sufficient level of granularity, an argument could be made that this music content is derivative (meaning, in effect, that all music content is derivative). The terms "derivative" and "non-derivative" are not used in this sense in the present disclosure. With regard to the computer generation of music content, such computer generation is said to be derivative (and result in derivative music content) if the computer generation selects portions of components from pre-existing music content of an entity other than the controlling entity (e.g., the computer program selects a particular portion of an audio file of a popular artist's work for inclusion in a piece of music content being generated). On the other hand, computer generation of music content is said to be non-derivative (and result in non-derivative music content) if the computer generation does not utilize such components of such pre-existing content. Note some pieces of "original music content" may be derivative music content, while some pieces may be non-derivative music content.

It is noted that the term "derivative" is intended to have a broader meaning within the present disclosure than the term "derivative work" that is used in U.S. copyright law. For example, derivative music content may or may not be a derivative work under U.S. copyright law. The term "derivative" in the present disclosure is not intended to convey a negative connotation; it is merely used to connote whether a particular piece of music content "borrows" portions of content from another work.

Further, the phrases "new music content," "novel music content," and "original music content" are not intended to encompass music content that is only trivially different from a pre-existing combination of musical elements. For example, merely changing a few notes of a pre-existing musical work does not result in new, novel, or original music content, as those phrases are used in the present disclosure. Similarly, merely changing a key or tempo or adjusting a relative strength of frequencies (e.g., using an equalizer interface) of a pre-existing musical work does not produce new, novel, or original music content. Moreover, the phrases, new, novel, and original music content are not intended to cover those pieces of music content that are borderline cases between original and non-original content; instead, these terms are intended to cover pieces of music content that are unquestionably and demonstrably original, including music content that would be eligible for copyright protection to the controlling entity (referred to herein as "protectable" music content). Further, as used herein, the term "available" music content refers to music content that does not violate copyrights of any entities other than the controlling entity. New and/or original music content is often protectable and available. This may be advantageous in preventing copying of music content and/or paying royalties for music content.

Although various embodiments discussed herein use rule-based engines, various other types of computer-implemented algorithms may be used for any of the computer learning and/or music generation techniques discussed herein. Rule-based approaches may be particularly effective in the music context, however.

Overview of Applications, Storage Elements, and Data that May be Used in Exemplary Music Systems A music generator module may interact with multiple different applications, modules, storage elements, etc. to generate music content. For example, end users may install one of multiple types of applications for different types of computing devices (e.g., mobile devices, desktop computers, DJ equipment, etc.). Similarly, another type of application may be provided to enterprise users. Interacting with applications while generating music content may allow the music generator to receive external information that it may use to determine target music attributes and/or update one or more rule sets used to generate music content. In addition to interacting with one or more applications, a music generator module may interact with other modules to receive rule sets, update rule sets, etc. Finally, a music generator module may access one or more rule sets, audio files, and/or generated music content stored in one or more storage elements. In addition, a music generator module may store any of the items listed above in one or more storage elements, which may be local or accessed via a network (e.g., cloud-based).

FIG. 2 is a block diagram illustrating an exemplary overview of a system for generating output music content based on inputs from multiple different sources, according to some embodiments. In the illustrated embodiment, system 200 includes rule module 210, user application 220, web application 230, enterprise application 240, artist application 250, artist rule generator module 260, storage of generated music 270, and external inputs 280.

User application 220, web application 230, and enterprise application 240, in the illustrated embodiment, receive external inputs 280. In some embodiments, external inputs 280 include: environment inputs, target music attributes, user input, sensor input, etc. In some embodiments, user application 220 is installed on a user's mobile device and includes a graphical user interface (GUI) that allows the user to interact/communicate with rule module 210. In some embodiments, web application 230 is not installed on a user device, but is configured to run within a browser of a user device and may be accessed through a website. In some embodiments, enterprise application 240 is an application used by a larger-scale entity to interact with a music generator. In some embodiments, application 240 is used in combination with user application 220 and/or web application 230. In some embodiments, application 240 communicates with one or more external hardware devices and/or sensors to collect information concerning the surrounding environment.

Rule module 210, in the illustrated embodiment, communicates with user application 220, web application 230, and enterprise application 240 to produce output music content. In some embodiments, music generator 160 is included in rule module 210. Note that rule module 210 may be included in one of applications 220, 230, and 240 or may be installed on a server and accessed via a network. In some embodiments, applications 220, 230, and 240 receive generated output music content from rule module 210 and cause the content to be played. In some embodiments, rule module 210 requests input from applications 220, 230, and 240 regarding target music attributes and environment information, for example, and may use this data to generate music content.

Stored rule set(s) 120, in the illustrated embodiment, are accessed by rule module 210. In some embodiments, rule module 210 modifies and/or updates stored rule set(s) 120 based on communicating with applications 220, 230, and 240. In some embodiments, rule module 210 accesses stored rule set(s) 120 to generate output music content. In the illustrated embodiment, stored rule set(s) 120 may include rules from artist rule generator module 260, discussed in further detail below.

Artist application 250, in the illustrated embodiment, communicates with artist rule generator module 260 (which may be part of the same application or may be cloud-based, for example). In some embodiments, artist application 250 allows artists to create rule sets for their specific sound, e.g., based on previous compositions. This functionality is further discussed U.S. Pat. No. 10,679,596. In some embodiments, artist rule generator module 260 is configured to store generated artist rule sets for use by rule module 210. Users may purchase rule sets from particular artists before using them to generate output music via their particular application. The rule set for a particular artist may be referred to as a signature pack.

Stored audio file(s) and corresponding attribute(s) 110, in the illustrated embodiment, are accessed by module 210 when applying rules to select and combine tracks to generate output music content. In the illustrated embodiment, rule module 210 stores generated output music content 270 in storage element.

In some embodiments, one or more of the elements of FIG. 2 are implemented on a server and accessed via a network, which may be referred to as a cloud-based implementation. For example, stored rule set(s) 120, audio file(s)/attribute(s) 110, and generated music 270 may all be stored on the cloud and accessed by module 210. In another example, module 210 and/or module 260 may also be implemented in the cloud. In some embodiments, generated music 270 is stored in the cloud and digitally watermarked. This may allow detection of copying generated music, for example, as well as generating a large amount of custom music content.

In some embodiments, one or more of the disclosed modules are configured to generate other types of content in addition to music content. For example, the system may be configured to generate visual content based on target music attributes, determined environmental conditions, currently-used rule sets, etc. As another example, the system may search a database or the Internet based on current attributes of the music being generated and display a collage of images that dynamically changes as the music changes and matches the attributes of the music.

Exemplary Machine Learning Approaches

As described herein, music generator module 160, shown in FIG. 1, may implement a variety of artificial intelligence (AI) techniques (e.g., machine learning techniques) to generate output music content 140. In various embodiments, AI techniques implemented include a combination of deep neural networks (DNN) with more traditional machine learning techniques and knowledge-based systems. This combination may align the respective strengths and weaknesses of these techniques with challenges inherent in music composition and personalization systems. Music content has structure at multiple levels. For instance, a song has sections, phrases, melodies, notes and textures. Some machine learning techniques may be effective at analyzing and generating high level and low-level details of music content. For example, DNNs may be good at classifying the texture of a sound as belonging to a clarinet or an electric guitar at a low level or detecting verses and choruses at a high level. The middle levels of music content details, such as the construction of melodies, orchestration, etc. may be more difficult. DNNs are typically good at capturing a wide range of styles in a single model and thus, DNNs may be implemented as generative tools that have a lot of expressive range.

In some embodiments, music generator module 160 utilizes expert knowledge by having human-composed audio files (e.g., loops) as the fundamental unit of music content used by the music generator module. For example, social context of expert knowledge may be embedded through the choice of rhythms, melodies and textures to record heuristics in multiple levels of structure. Unlike the separation of DNN and traditional machine learning based on a structural level, expert knowledge may be applied in any areas where musicality can be increased without placing too strong of limitations on the trainability of music generator module 160.

In some embodiments, music generator module 160 uses DNNs to find patterns of how layers of audio are combined vertically, by layering sounds on top of each other, and horizontally, by combining audio files or loops into sequences. For example, music generator module 160 may implement an LSTM (long short-term memory) recurrent neural network, trained on MFCC (Mel-frequency cepstral coefficient) audio features of loops used in multitrack audio recordings. In some embodiments, a network is trained to predict and select audio features of loops for upcoming beats of music based on knowledge of the audio features of previous beats. For example, the network may be trained to predict the audio features of loops for the next 8 beats based on knowledge of the audio features of the last 128 beats. Thus, the network is trained to utilize a low-dimension feature representation to predict upcoming beats.

In certain embodiments, music generator module 160 uses known machine learning algorithms for assembling sequences of multitrack audio into musical structures with dynamics of intensity and complexity. For instance, music generator module 160 may implement Hierarchical Hidden Markov Models, which may behave like state machines that make state transitions with probabilities determined by multiple levels of hierarchical structure. As an example, a specific kind of drop may be more likely to happen after a buildup section but less likely if the end of that buildup does not have drums. In various embodiments, the probabilities may be trained transparently, which is in contrast to the DNN training where what is being learned is more opaque.

A Markov Model may deal with larger temporal structures and thus may not easily be trained by presenting example tracks as the examples may be too long. A feedback control element (such as a thumbs up/down on the user interface) may be used to give feedback on the music at any time. Correlations between the music structure and the feedback may then be used to update structural models used for composition, such as transition tables or Markov models. This feedback may also be collected directly from measurements of heart-rate, sales, or any other metric where the system is able to determine a clear classification. Expert knowledge heuristics, described above, are also designed to be probabilistic where possible and trained in the same way as the Markov model.

In certain embodiments, training may be performed by composers or DJs. Such training may be separate from listener training. For example, training done by listeners (such as typical users) may be limited to identifying correct or incorrect classification based on positive and negative model feedback, respectively. For composers and DJs, training may include hundreds of timesteps and include details on layers used and volume control to give more explicit detail into what is driving changes in music content. For example, training performed by composers and DJs may include sequence prediction training similar to global training of DNNs, described above.

In various embodiments, a DNN is trained to predict interactions a DJ might have with their audio interface at any moment in time given a sequence of the most recently played music. In some embodiments, these interactions may be recorded and used to develop new heuristics that are more transparent. In some embodiments, the DNN receives a number of previous measures of music as input and utilizes a low-dimension feature representation, as described above, with additional features that describe modifications to a track that a DJ or composer has applied. For example, the DNN may receive the last 32 measures of music as input and utilize the low-dimension feature representation along with additional features to describe modifications to the track that a DJ or composer has applied. These modifications may include adjustments to gain of a particular track, filters applied, delay, etc. For example, a DJ may use the same drum loop repeated for five minutes during a performance but may gradually increase the gain and delay on the track over time. Therefore, the DNN may be trained to predict such gain and delay changes in addition to loop selection. When no loops are played for a particular instrument (e.g., no drum loops are played), the feature set may be all zeros for that instrument, which may allow the DNN to learn that predicting all zeros may be a successful strategy, which can lead to selective layering.

In some instances, DJs or composers record live performances using mixers and devices such as TRAKTOR (Native Instruments GmbH). These recordings are typically captured in high resolution (e.g., 4 track recording or MIDI). In some embodiments, the system disassembles the recording into its constituent loops yielding information about the combination of loops in a composition as well as the sonic qualities of each individual loop. Training the DNN (or other machine learning) with this information provides the DNN with the ability to correlate both composition (e.g., sequencing, layering, timing of loops, etc.) and sonic qualities of loops to inform music generator module 160 how to create music experiences that are similar to the artists performance without using the actual loops the artist used in their performance.

Exemplary Music Generator with Comparison Training

One technique for generating music content combines generator and classifier (or "discriminator") subsystems to produce new artifacts in the generated music. One named technique is "generative adversarial networks (or GANs)." GANs utilize an approach of training a music generator to "fool" a classifier into an incorrect classification and the classifier using correct and incorrect classification attempts as new data for training and improving the classifier. Such input is provided in the hopes that the generator will get better at fooling the classifier and the classifier will get better at correctly classifying, creating a feedback loop that results in better performance in both. The processes of training these subsystems often relies on the subsystems being constructed as differentiable networks that can be trained through the process of backpropagation.

When a complex non-differentiable process is part of the music generator, however, backpropagation alone may not be appropriate for training and a slower, more complex reinforcement learning approach may be needed. Unlike GANs, reinforcement learning includes machine learning where the system involves an "agent" and "environment" and the design of the environment can have a large impact on system outcomes but training isn't performed through a specific technique. In some instances, reinforcement learning can be slow, expensive, and produce interesting but not necessarily high-quality results. To overcome these deficiencies, the present inventors have recognized that improvements can be made by implementing a system that utilizes a reinforcement learning approach with a new, music specific environment designed to increase the musicality of system output through human-in-the-loop processes and utilization of high-quality audio processing.

Figure 3:
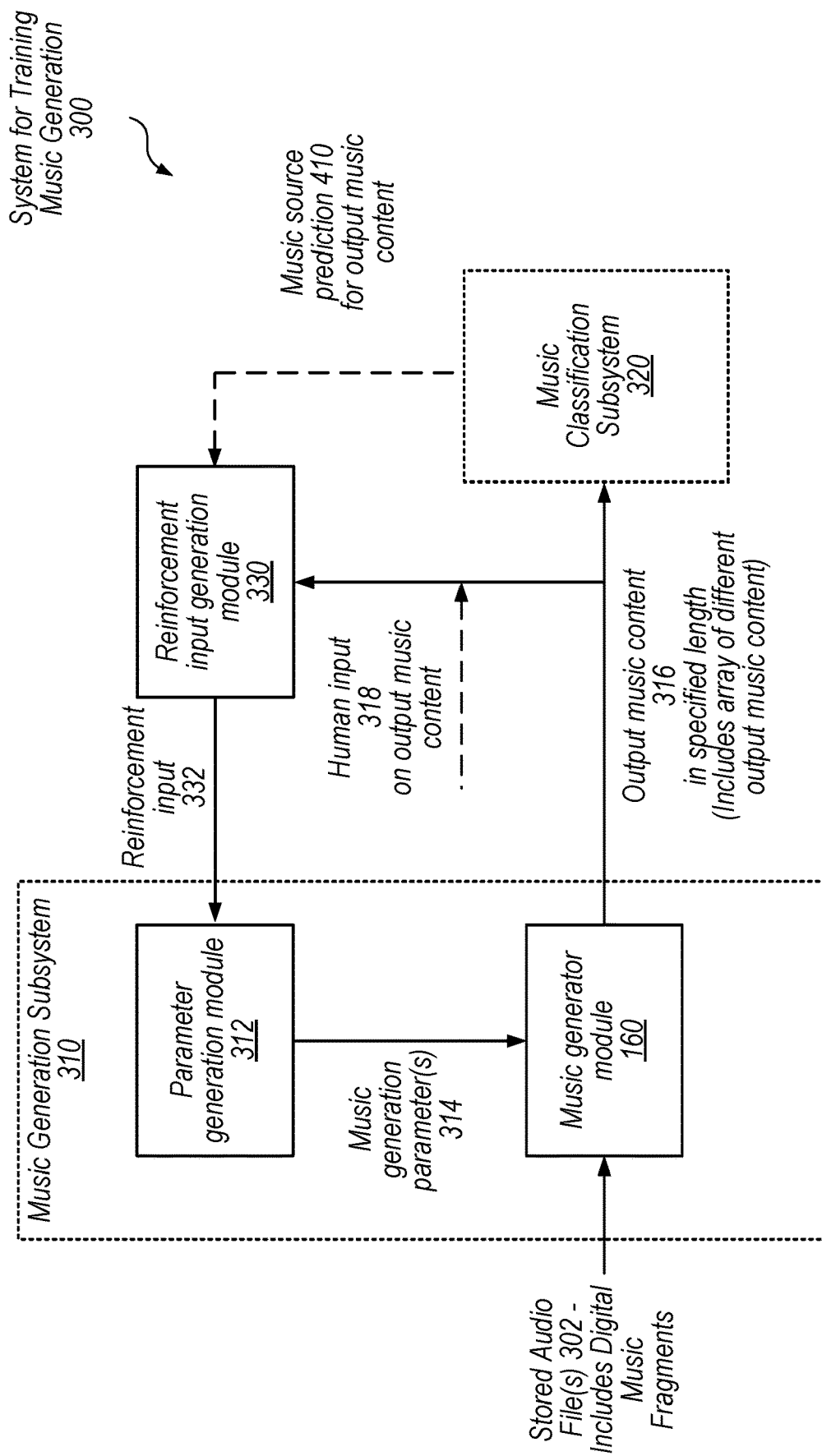
FIG. 3 is a block diagram illustrating an exemplary music generator system configured to train music generation and classification of music content, according to some embodiments.

FIG. 3 is a block diagram illustrating an exemplary music generator system configured to train music generation and classification of music content, according to some embodiments. In the illustrated embodiment, system 300 includes music generation subsystem 310 and music classification subsystem 320. In certain embodiments, music generation subsystem 310 is located on a specific user device (such as a personal computer, laptop, mobile device, or portable device) while music classification subsystem is located remotely (e.g., in the cloud). Other embodiments of locations for the subsystems are also contemplated. In certain embodiments, music generation subsystem 310 includes music generator module 160 and parameter generation module 312. System 300 also includes reinforcement input generation module 330, which may be located separately from music generation subsystem 310 and music classification subsystem 320 or may be located in one of those subsystems.

In various embodiments, music generator module 160 accesses stored audio files 302 to generate output music content 316. In certain embodiments, music generator module 160 generates output music content 316 from digital music fragments in stored audio files 302. In various embodiments, digital music fragments are prerecorded music fragments. Digital music fragments may include, for example, samples or bits of prerecorded digital music (such as partial samples of songs or compositions). Digital music fragments may also include prerecorded instrument sampling or other prerecorded music sampling.

In certain embodiments, output music content 316 is a music stream or composition of a specified length (such as 30 seconds or 60 seconds). For example, output music content 316 may be a composition with a specified length that is generated from multiple audio files, portions of multiple audio files, or multiple music fragments. In various embodiments, output music content 316 includes an array of different output music content. For instance, the array may include various compositions of the specified length generated from any combination of musical fragments.

In various embodiments, the array in output music content 316 provides an environment for reinforcement learning in system 300. In certain embodiments, providing the environment includes filling the array with any number of possible compositions of the specified length that can be generated from a set of musical fragments retrieved by the music generator module 160 from the stored audio files. In some embodiments, the array may be filled with every possible composition of the specified length that can be generated from a set of musical fragments. With a large number of compositions being possible from a set of musical fragments, in many embodiments, a fraction (possibly, only a small fraction) of the compositions generated by music generator module 160 are what might be considered by a typical person as musical.

In various embodiments, music generator module 160 generates output music content 316 from stored audio files 302 (e.g., digital music fragments) according to one or more music generation parameters 314. As used herein, music generation parameters 314 may include parameters that control the selection and processing of music fragments or other samples that are combined to generate output music content 316. In various embodiments, music generation parameters 314 define a policy for generating music. For example, a policy may describe how digital music fragments can be combined in sequence and in concurrent layers and then modified with music production audio effects (such as through music controls, described herein) including reverb, delay, noise gates, equalization, gain control, and band filters. Such processes and effects are commonly used in modern music production. In some contemplated embodiments, if a set of digital music fragments is curated by a person with some musical knowledge (e.g., through music controls), a random application of the processes in the policy may result in a baseline output of music content compositions that most people would consider to be music (and quite possibly good music).

Figure 5:
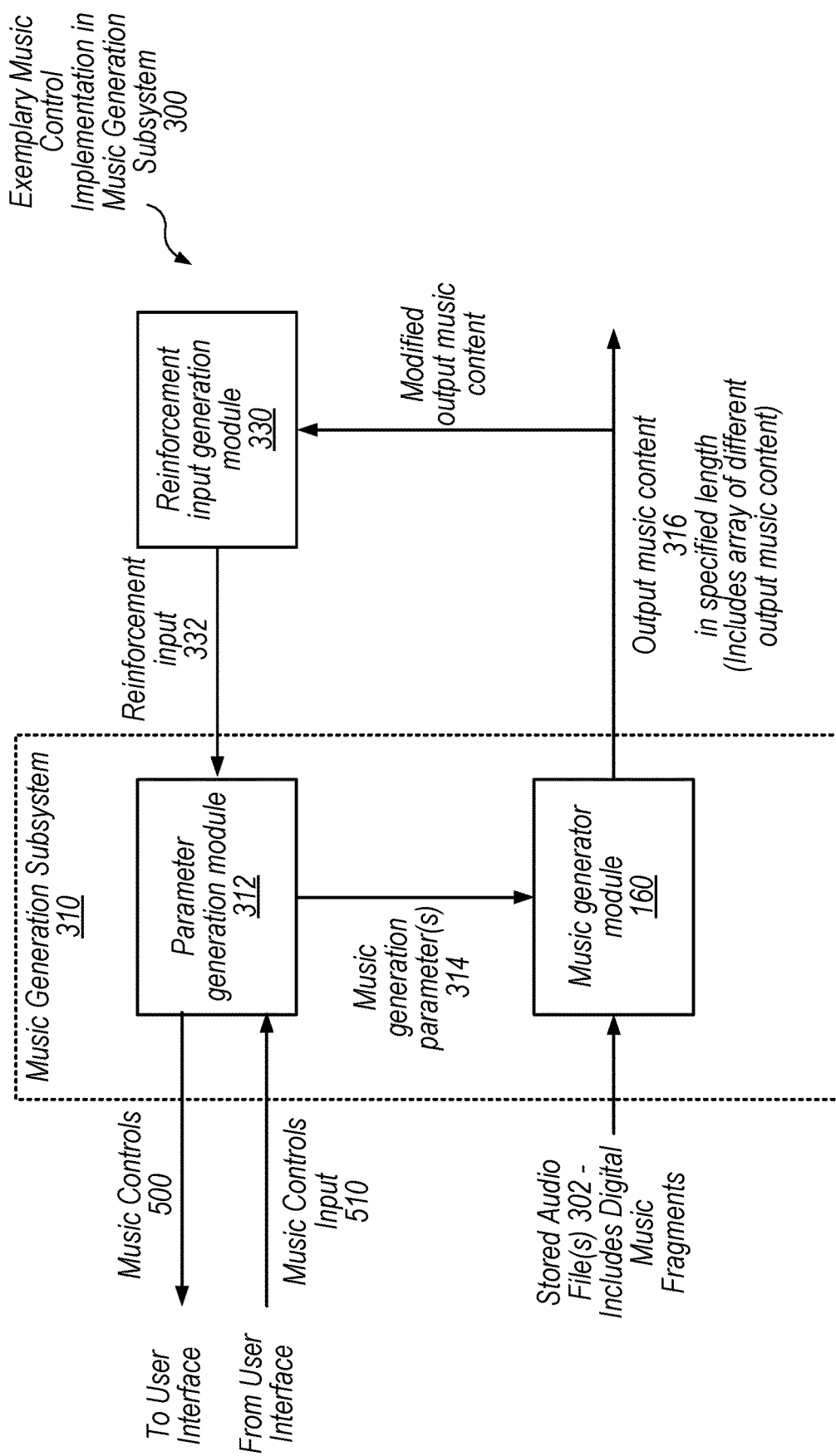
FIG. 5 is a block diagram illustrating an exemplary music control implementation in a music generation subsystem, according to some embodiments.

In various embodiments, music generation parameters 314 include parameters that have been previously generated (such as by parameter generation module 312) or parameters that have been user-created (e.g., using music controls input 510, shown in FIG. 5). In certain embodiments, music generation parameters 314 are generated by parameter generation module 312. In the illustrated embodiment, reinforcement learning for parameter generation module 112 and music generation subsystem 310 is provided by reinforcement input 332 received from reinforcement input generation module 330. In certain embodiments, parameter generation module 312 implements an algorithm (e.g., a trained machine learning algorithm) to generate music generation parameters 314. For example, parameter generation module 312 may implement an algorithm that adjusts music generation parameters 314 based on input from other systems. Accordingly, the algorithm is tunable (e.g., trainable) based on reinforcement input 332 and music generation parameters 314 may be considered tunable parameters in music generation subsystem 310.

Figure 4:
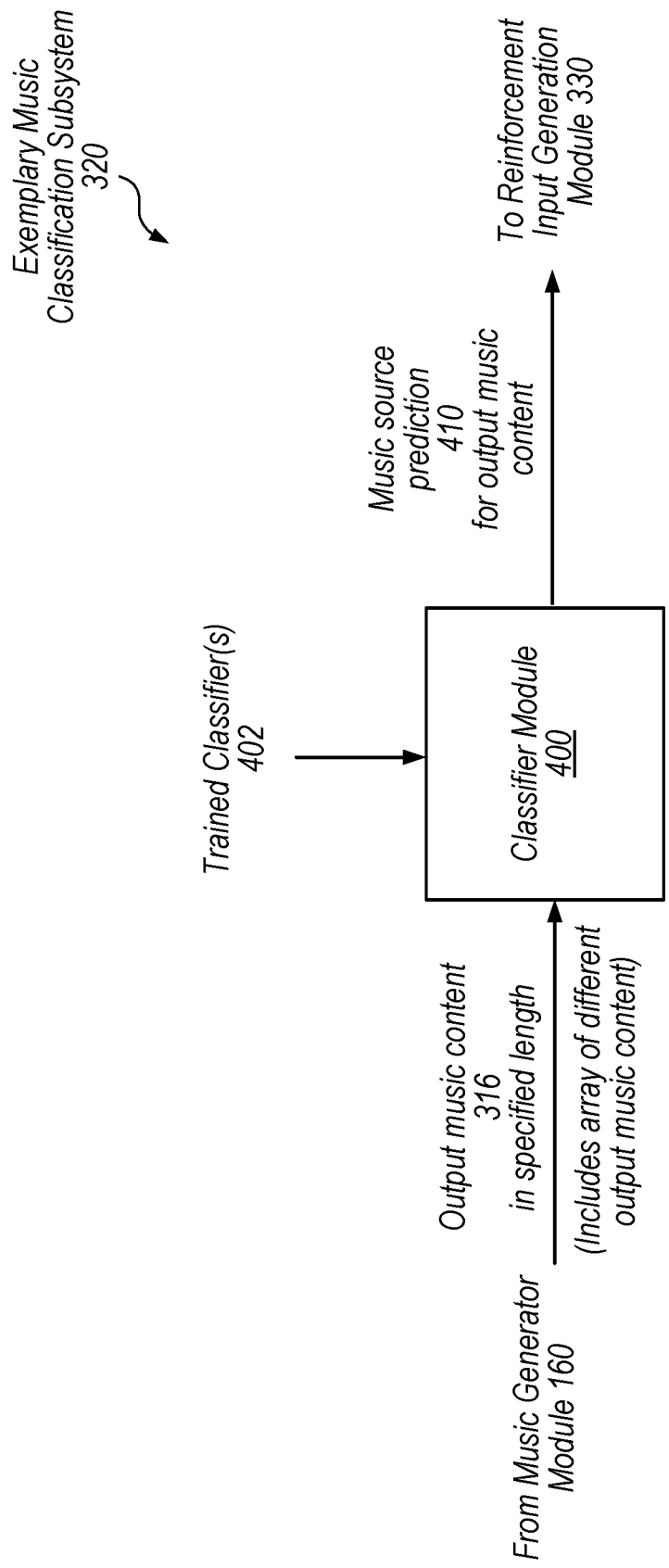
FIG. 4 is a block diagram illustrating an exemplary music classification subsystem, according to some embodiments.

In some embodiments, input for tuning of the algorithm includes output from music classification subsystem 320. For example, reinforcement input 332 may be based on predictions of a music source by music classification subsystem 320 for output music content generated by music generator module 160. FIG. 4 is a block diagram illustrating an exemplary music classification subsystem 320, according to some embodiments. In the illustrated embodiment, music classification subsystem 320 includes classifier module 400. Classifier module 400 may implement, for example, a machine learning algorithm that provides classification using one or more classifiers. In certain embodiments, classifier module 400 is a trained classifier module using one or more trained classifiers 402 to provide classification of music content. Training of classifier module 400 is detailed further in the embodiment of FIG. 6, described below.

In certain embodiments, classifier module 400 receives output music content 316 (which may include an array of different music output content) as input. From this input, classifier module 400 may implement one or more trained classifiers 402 to determine music source prediction 410 for output music content 316. Music source prediction 410 may include a prediction on whether output music content 316 has been generated by a human composer or by music generator module 160 (e.g., whether the music source is a human composer or the music generator module). In some embodiments, music source prediction 410 prediction includes a probability that output music content 316 is either generated by a human composer or by music generator module 160. For instance, music source prediction 410 may be a percentage probability that output music content 316 was generated by music generator module 160. Music source prediction 410 may then be provided to reinforcement input generation module 330.

Turning back to FIG. 3, in various embodiments, music source prediction 410 for output music content 316 may not be differentiable by parameter generation module 312 and music generator subsystem 310. Accordingly, in certain embodiments, reinforcement input 332 for tuning of the algorithm in parameter generation module 312 may be determined from music source prediction 410 by reinforcement input generation module 330. In some embodiments, reinforcement input generation module 330 tunes music source prediction 410 based on a reward-type system. In such embodiments, reinforcement input generation module 330 may reward music generation subsystem 310 based on how well output music content 316 "tricked" music classification subsystem 320 into believing the output music content was generated by a human composer. For instance, reinforcement input generation module 330 may provide a higher reward for higher probabilities in music source prediction 410 that output music content 316 was generated by a human composer since the higher the predicted probability, the more likely music classification subsystem 320 was tricked by music generation subsystem 310 into believing the output music content was generated by a human composer.

In some embodiments, reinforcement input 332 may be binary input. Binary input may be provided as a replacement for differentiable input for tuning of the algorithm in parameter generation module 312 to generate music generation parameters 314. In various embodiments, binary input includes a binary decision on whether music content satisfies a listening threshold. The listening threshold may be satisfied, for instance, when the music content is determined to be "good" (e.g., musical) versus "bad" (e.g., not musical). In some embodiments, the binary input decision may be implemented by a computer algorithm (e.g., a trained machine learning algorithm). In other embodiments, binary input may be provided as human input 318, described herein, on output music content 316.

In various embodiments, the generation of music generation parameters 314 (e.g., generation of music generation policy) is human readable and human modifiable. Making the generation parameters 314 human readable or human modifiable may reduce the time and processor cost of producing music. Additionally, by facilitating easier manual optimization by a user and providing reinforcement in the training of the algorithm in parameter generation module 312 in order to generate music generation parameters 314, the likelihood of generating compositions musical in nature may be increased. In certain embodiments, the implementation of making the generation of music generation parameters 314 human readable or human modifiable includes the addition of user-facing music controls in the music generation process.

FIG. 5 is a block diagram illustrating an exemplary music control implementation in music generation subsystem 310, according to some embodiments. In the illustrated embodiment, music controls 500 are implemented by parameter generation module 312 and provided to a user interface. Music controls input 510 from the user is then received by parameter generation module 312 from the user interface. As described above, music generation parameters 314 may define a policy that is used to control the process of music generation by music generator module 160. Music controls 500 may allow user input on music production that is represented according to music production methods familiar to music producers, music artists, or other music knowledgeable users. Accordingly, users may be able to produce music content by providing input through music controls 500 that favorably affect generated output music content 316.

In some embodiments, the process of music generation between parameter generation module 312 and music generator module 160 is differentiable within music generation subsystem 310. For example, music controls input 510 may be differentiable from the generation of music generation parameters 314 within music generation subsystem 310. Accordingly, initial settings for music generation parameters 314 may be found through backpropagation between music controls 510 and parameter generation module 312. The generation of initial settings may provide a non-random starting position for the refinement (e.g., tuning) of music generation parameters 314 based on reinforcement input 332. For instance, the refinement of music generation parameters 314 based on reinforcement input 332 may begin from a more musical "known" position rather than a random unknown musical position.

Implementing music controls 500 may also allow the generation of music generation parameters 314 based on musical events (such as playback of generated music content). Thus, a large range (potentially in millions or billions) of unique minutes of output music content may be generated by music generator module 160 that is continuously varied and not overly repetitive.

As described above, music controls 500 may be implemented to define a music generation policy (through music generation parameters 314) that is designed through the use of common music controls for a person with music knowledge. Thus, the person may be able to quickly hand-tune the music generation policy in order to reduce the time and expense of training music generation subsystem 310. In various embodiments, music controls 500 are applied to provide control over the selection and processing of music fragments by music generator module 160 in generating output music content 316. In certain embodiments, music controls 500 provide control over one or more audio properties of output music content 316. Examples of music controls 500 include, but are not limited to, gain, high pass cutoff, low pass cutoff, reverb send level, reverb length, delay level, delay time, bass, beats, pads, tops, melodies, backing melodies, chords, effects, and combinations thereof. Music controls 500 may be applied to either audio fragments (e.g., digital music fragments), music tracks (e.g., output music content 316), or combinations thereof.

As described above, the application of music controls input 510 to output music content 316 may modify the output music content according to the user's musical tastes. In various embodiments, the modified output music content 316 generated by music generation module 160 is provided as reinforcement input 332 to parameter generation module 312. In such embodiments, the modified output music content 316 may be input into parameter generation module 312 as a vector or a set of vectors. Providing the modified music content as vector(s) may facilitate the selection (versus generation) of unprocessed audio content (e.g., digital music fragments) to play in output music content 316 after reinforcement learning by parameter generation module 312. For instance, music generation parameters determined by parameter generation module 312 may facilitate the searching of a library of audio files (such as stored audio files 302) for digital music fragments with the closest features to those described by the policy (as described by music generation parameters 314) and use those selected fragments to generate output music content 316. Accordingly, music generator module 160 is implemented in a role more analogous to a music arranger (e.g., selecting and arranging music fragments) than a music composer (e.g., creating new music from individual notes).

As an example, a 30 second audio sample of output music content 316, where a user has applied music controls 500 to modify the output music content, may be used as reinforcement input 332 to parameter generation module 312 in vector form. Non-limiting examples of vector contents may include, for example: {0.1,0.2,0.1,0.4 . . . 0.7}—a 64-element vector that describes the reduced feature representation of audio to be used on the bass track for the next beat of music; {0.6} audio signal gain to be used for playing the selected audio; {20.0} a high pass filter of 20 Hz should be applied; {16000.0} a low pass filter of 16000 Hz should be applied; {0.1} a reverb auxiliary send level of 0.1; {2.0} a decay time of 2 beats; {0.0} no delay should be used; and {1.0} a delay length of 1 beat.

Vectors, such as those described above, may be generated through a machine learning algorithm or other algorithm that produces floating point number vector(s) by mathematical transformations. For instance, vectors may be generated through a feature reduction algorithm that regularizes the space of reduced features (such as a Variational Auto-Encoder) or common audio content analysis vectors. In various embodiments, a history of decisions made with a policy (e.g., a history of tuning based on modified content) and digital music fragment content selected may be stored in a ledger or other library. Storing this information may allow percentages and specific selection of files to be determined from a library of content from different artists (e.g., stored audio files 302).

Turning back to FIG. 3, as described above, human input 318 on output music content 316 may be provided by a user (such as an artist or listener). In certain embodiments, implementing human input 318 includes input based on the user's interpretation of output music content 316. For example, a human user may provide input on whether music sounds good or bad to the user. The input may be provided through a user interface of a device (such as a like/dislike selection).

Other embodiments of human input implementation in reinforcement input 332 are also contemplated. For example, a classifier module (such as classifier module 400, shown in FIG. 4, or another classifier module implemented in the system) may be trained to classify between music that a listener likes and doesn't like based on selections made by the listener (such as through a like/dislike selection on the user interface). When the music liked by a listener has been generated by music generator module 160, the like by the listener may be provided to reinforcement input generation module 330 and used as reinforcement input 332 to reinforce (e.g., provide positive feedback) that music generation parameters 314 generated by parameter generation module 312 are producing likable music for the user.

Figure 6:
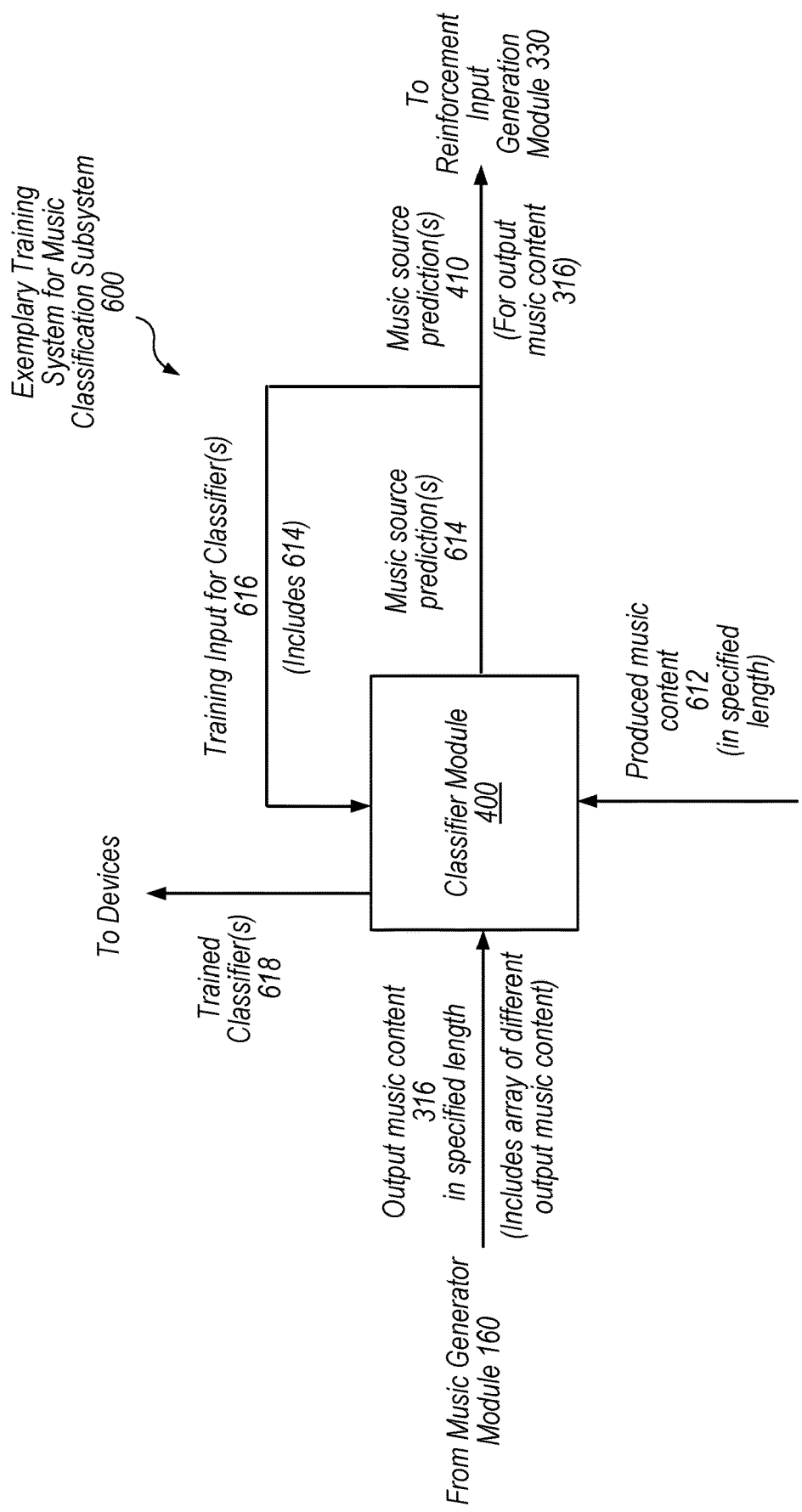
FIG. 6 is a block diagram illustrating an exemplary training system for a music classification subsystem, according to some embodiments.

FIG. 6 is a block diagram illustrating an exemplary training system 600 for music classification subsystem 320, according to some embodiments. In the illustrated embodiment of training, classifier module 400 receives either output music content 316 or produced music content 612. Either type of music content may be received in a specified length (e.g., 30 or 60 second samples). Produced music content 612 may include, for example, professionally produced music content produced or other music content produced by a musical expert. In training embodiments, output music content 316 or produced music content 612 may be input to classifier module 400 with labels identifying parameters of the music content. For instance, the labels may include identification on whether the music was generated by music generator module 160 or the music was professionally produced. Other labels are also contemplated.

In certain embodiments, classifier module 400 implements one or more classifiers to determine music source prediction 614 for the input music content. For example, classifier module 400 may determine a prediction that the source of the music content input into the module was either music generator module 160 or a human (professional) producer. In various embodiments, music source prediction 614 includes a probability that the input music content is either generated by music generator module 160 or by a human composer. For instance, music source prediction 614 may be a percentage probability that the input music content was generated by music generator module 160. In some embodiments, as shown in FIG. 4, music source predictions 410 (e.g., music source predictions for output music content 316 input into classifier module 400) is output to reinforcement input generation module 330.

In the illustrated embodiment for training, training input for classifiers 616, which includes music source predictions 614 for either type of music content input, is used as the basis of an accuracy measurement used for backpropagation in classifier module 400. Propagating music source predictions 614 back into classifier module 400 includes providing both the label identifying the source for the music content input and the output prediction (music source prediction 614) for the source of the music content input. Classifier module 400 may then adjust classifier(s) in the module according to the differences in the label and music source prediction 614. After training, classifier module 400 may output trained classifiers 618. Trained classifiers 618 may be provided to devices that have an installation of the music generation system (e.g., personal or portable devices with the music generation system application installed on the device). In some embodiments, trained classifiers are provided to a device as part of the installation of the music generation system on the device.

Additional embodiments are contemplated where classifier module 400 is trained to make other classifications on music content. For example, some embodiments are contemplated in which classifier module 400 is trained to classify music as being created by a specific producer. In such embodiments, identifying the specific producer of music content may allow the generation of policies (by parameter generation module 312) that produce music content more likely to be classified as being from the specific producer.

Turning back to FIG. 3, in various embodiments, music generation subsystem 310 and music classification subsystem 320 are implemented to produce music that changes based on the feedback from listeners (e.g., users). In some embodiments, however, implementing classification based on human input (e.g., likes/dislikes of music) on a large scale for music generation subsystem 310 installed on certain types of devices (e.g., mobile devices) may not be desirable or possible due to the limited storage capacity of such devices and the library of information that needs to be stored for training/learning by a classifier. Accordingly, in certain embodiments, music generation subsystem 310 is installed on a device with initial training parameters (e.g., initial trained classifiers) and reinforcement learning is implemented on the device to improve music generation by the system. In such embodiments, input on likes/dislikes (or other similar choices) from one or more users may be used to train a classifier module located on a remote computing device connected to devices with the music generation system installed (e.g., a classifier module located in the cloud).

The classifier module located in the cloud may be trained based on input (feedback) from the user(s) during operation of the music generation system to better predict music content that the user(s) may like or dislike. After some of the additional training of the classifier module in the cloud, a vector for a user (or a set of vectors for multiple users) may be generated. A vector may be generated to represent the musical taste of a specific user. The vector may be, for example, a 64-element vector that represents the musical taste of the specific user. The vector may then be provided to the specific user's device for implementation as reinforcement input (e.g., reinforcement input 332) for music generation subsystem 310 installed on the device. Accordingly, updates to the classifier are not needed to be sent to the device and storage of large numbers of libraries on the device is not needed. Additionally, a single initial, comprehensive training process can be implemented for music generation subsystem 310, which is then installed on specific devices. Music generation subsystem 310 installed on a device may then be updated by reinforcement learning received as input from the cloud to avoid the need to fully train each music generation subsystem on each device. This may be advantageous as millions of unique music generation subsystems could be distributed on mobile devices and a single classifier module is trained for all of the subsystems, reducing training time and cost, and allowing for a centralized, managed training environment while having personalized results for each music generator.

Exemplary User and Enterprise GUIs

FIGS. 7A-7B are block diagrams illustrating graphical user interfaces, according to some embodiments. In the illustrated embodiment, FIG. 7A contains a GUI displayed by user application 710 and FIG. 7B contains a GUI displayed by enterprise application 730. In some embodiments, the GUIs displayed in FIGS. 7A and 7B are generated by a website rather than by an application. In various embodiments, any of various appropriate elements may be displayed, including one or more of the following elements: dials (e.g., to control volume, energy, etc.), buttons, knobs, display boxes (e.g., to provide the user with updated information), etc.

In FIG. 7A, user application 710 displays a GUI that contains section 712 for selecting one or more artist packs. In some embodiments, packs 714 may alternatively or additionally include theme packs or packs for a specific occasion (e.g., a wedding, birthday party, graduation ceremony, etc.). In some embodiments, the number of packs shown in section 712 is greater than the number that can be displayed in section 712 at one time. Therefore, in some embodiments, the user scrolls up and/or down in section 712 to view one or more packs 714. In some embodiments, the user can select an artist pack 714 based on which he/she would like to hear output music content. In some embodiments, artist packs may be purchased and/or downloaded, for example.

Selection element 716, in the illustrated embodiment, allows the user to adjust one or more music attributes (e.g., energy level). In some embodiments, selection element 716 allows the user to add/delete/modify one or more target music attributes. In various embodiments, selection element 716 may render one or more UI control elements (e.g., music controls 500).

Selection element 720, in the illustrated embodiment, allows the user to let the device (e.g., mobile device) listen to the environment to determine target musical attributes. In some embodiments, the device collects information about the environment using one or more sensors (e.g., cameras, microphones, thermometers, etc.) after the user selects selection element 720. In some embodiments, application 710 also selects or suggests one or more artist packs based on the environment information collected by the application when the user selected element 720.

Selection element 722, in the illustrated embodiment, allows the user to combine multiple artist packs to generate a new rule set. In some embodiments, the new rule set is based on the user selecting one or more packs for the same artist. In other embodiments, the new rule set is based on the user selecting one or more packs for different artists. The user may indicate weights for different rule sets, e.g., such that a highly-weighted rule set has more effect on generated music than a lower-weighted rule set. The music generator may combine rule sets in multiple different ways, e.g., by switching between rules from different rule sets, averaging values for rules from multiple different rule sets, etc.

In the illustrated embodiment, selection element 724 allows the user to adjust rule(s) in one or more rule sets manually. For example, in some embodiments, the user would like to adjust the music content being generated at a more granular level, by adjusting one or more rules in the rule set used to generate the music content. In some embodiments, this allows the user of application 710 to be their own disk jockey (DJ), by using the controls displayed in the GUI in FIG. 7A to adjust a rule set used by a music generator to generate output music content. These embodiments may also allow more fine-grained control of target music attributes.

In FIG. 7B, enterprise application 730 displays a GUI that also contains an artist pack selection section 712 with artist packs 714. In the illustrated embodiment, the enterprise GUI displayed by application 730 also contains element 716 to adjust/add/delete one or more music attributes. In some embodiments, the GUI displayed in FIG. 7B is used in a business or storefront to generate a certain environment (e.g., for optimizing sales) by generating music content. In some embodiments, an employee uses application 730 to select one or more artist packs that have been previously shown to increase sales (for example, metadata for a given rule set may indicate actual experimental results using the rule set in real-world contexts).

Input hardware 740, in the illustrated embodiment, sends information to the application or website that is displaying enterprise application 730. In some embodiments, input hardware 740 is one of the following: a cash register, heat sensors, light sensors, a clock, noise sensors, etc. In some embodiments, the information sent from one or more of the hardware devices listed above is used to adjust target music attributes and/or a rule set for generating output music content for a specific environment. In the illustrated embodiment, selection element 738 allows the user of application 730 to select one or more hardware devices from which to receive environment input.

Display 734, in the illustrated embodiment, displays environment data to the user of application 730 based on information from input hardware 740. In the illustrated embodiment, display 732 shows changes to a rule set based on environment data. Display 732, in some embodiments, allows the user of application 730 to see the changes made based on the environment data.

In some embodiments, the elements shown in FIGS. 7A and 7B are for theme packs and/or occasion packs. That is, in some embodiments, the user or business using the GUIs displayed by applications 710 and 730 can select/adjust/modify rule sets to generate music content for one or more occasions and/or themes.

Detailed Example Music Generator System

Figure 8:
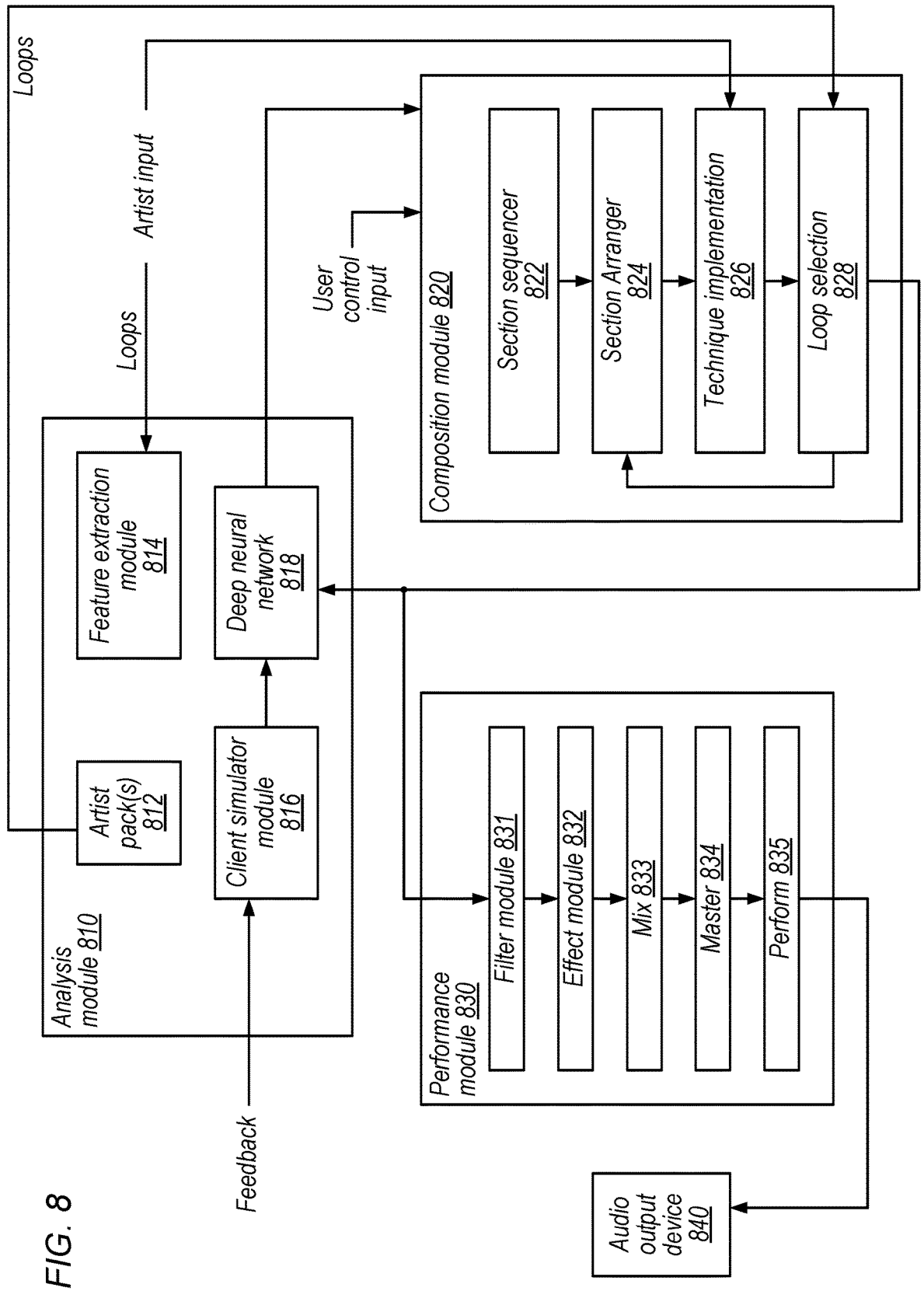
FIG. 8 is a block diagram illustrating an example music generator system that includes analysis and composition modules, according to some embodiments.
Figure 9:
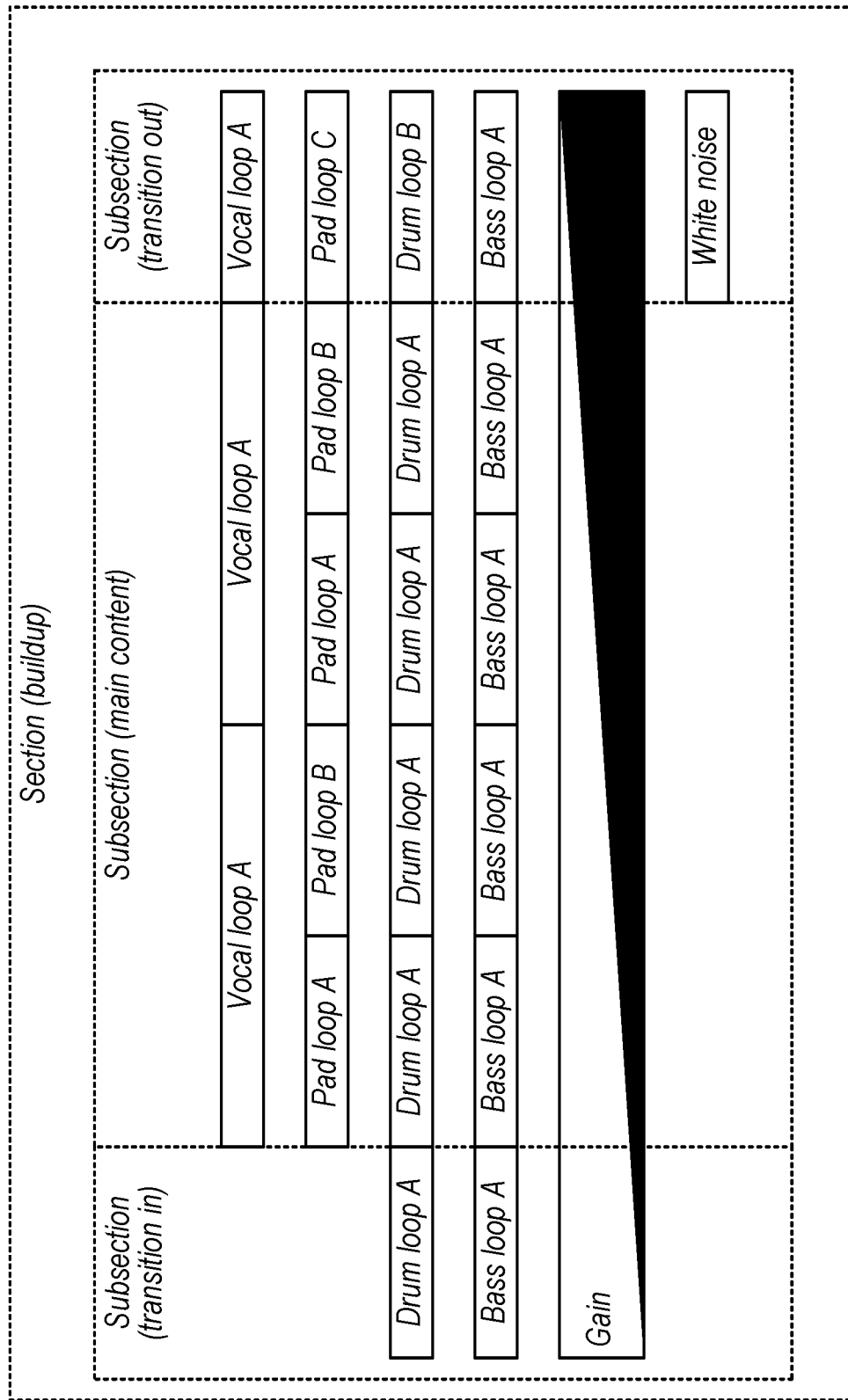
FIG. 9 is a diagram illustrating an example buildup section of music content, according to some embodiments.
Figure 10:
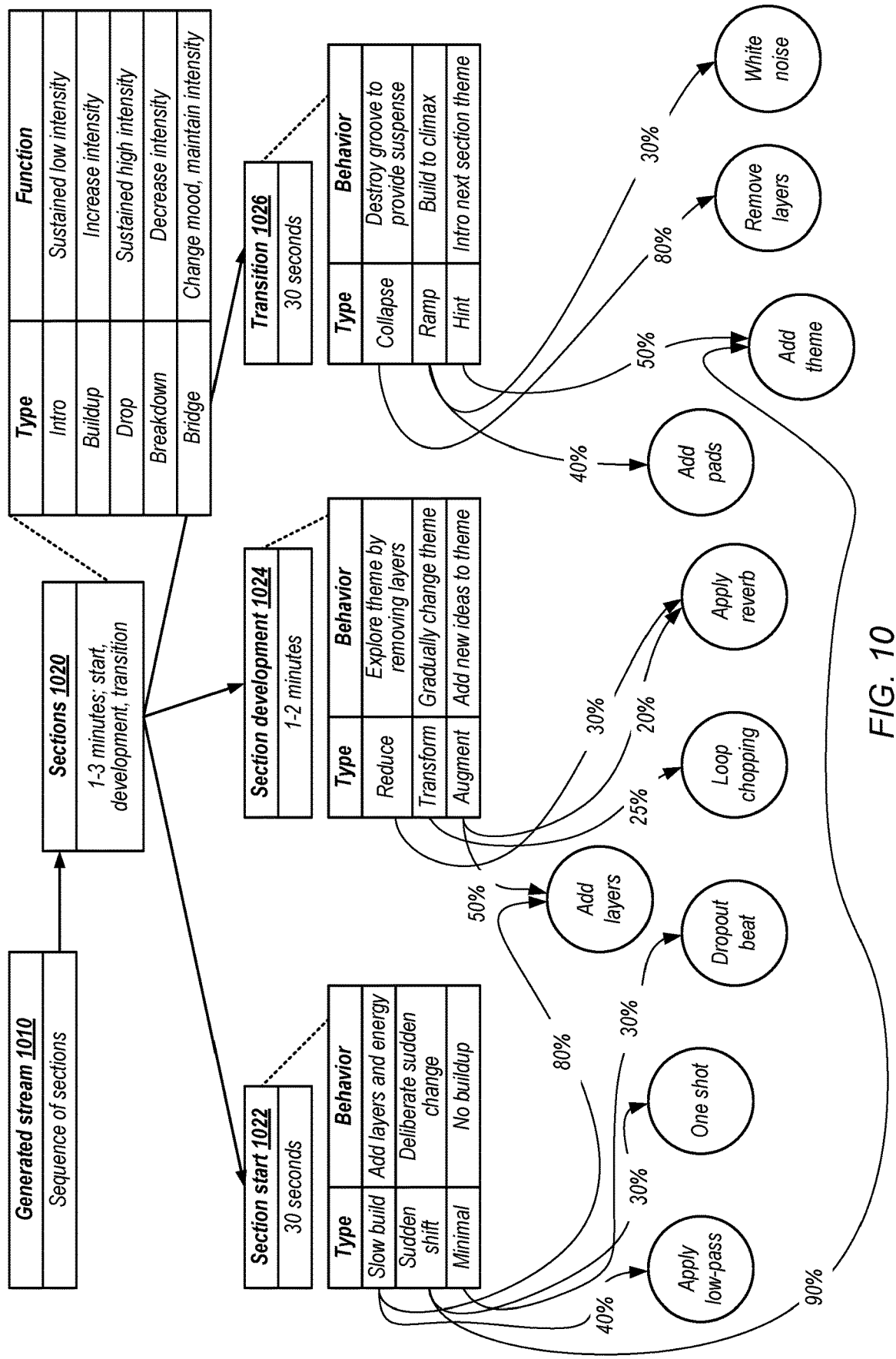
FIG. 10 is a diagram illustrating example techniques for arranging sections of music content, according to some embodiments.

FIGS. 8-10 show details regarding specific embodiments of music generator module 160. Note that although these specific examples are disclosed for purposes of illustration, they are not intended to limit the scope of the present disclosure. In these embodiments, construction of music from loops is performed by a client system, such as a personal computer, mobile device, media device, etc. As used in the discussion of FIGS. 8-10, the term "loops" may be interchangeable with the term "audio files". In general, loops are included in audio files, as described herein. Loops may be divided into professionally curated loop packs, which may be referred to as artist packs. Loops may be analyzed for music properties and the properties may be stored as loop metadata. Audio in constructed tracks may be analyzed (e.g., in real-time) and filtered to mix and master the output stream. Various feedback may be sent to the server, including explicit feedback such as from user interaction with sliders or buttons and implicit feedback, e.g., generated by sensors, based on volume changes, based on listening lengths, environment information, etc. In some embodiments, control inputs have known effects (e.g., to specify target music attributes directly or indirectly) and are used by the composition module.

The following discussion introduces various terms used with reference to FIGS. 8-10. In some embodiments, a loop library is a master library of loops, which may be stored by a server. Each loop may include audio data and metadata that describes the audio data. In some embodiments, a loop package is a subset of the loop library. A loop package may be a pack for a particular artist, for a particular mood, for a particular type of event, etc. Client devices may download loop packs for offline listening or download parts of loop packs on demand, e.g., for online listening.

A generated stream, in some embodiments, is data that specifies the music content that the user hears when they use the music generator system. Note that the actual output audio signals may vary slightly for a given generated stream, e.g., based on capabilities of audio output equipment.

A composition module, in some embodiments, constructs compositions from loops available in a loop package. The composition module may receive loops, loop metadata, and user input as parameters and may be executed by a client device. In some embodiments, the composition module outputs a performance script that is sent to a performance module and one or more machine learning engines. The performance script, in some embodiments, outlines which loops will be played on each track of the generated stream and what effects will be applied to the stream. The performance script may utilize beat-relative timing to represent when events occur. The performance script may also encode effect parameters (e.g., for effects such as reverb, delay, compression, equalization, etc.).

A performance module, in some embodiments, receives a performance script as input and renders it into a generated stream. The performance module may produce a number of tracks specified by the performance script and mix the tracks into a stream (e.g., a stereo stream, although the stream may have various encodings including surround encodings, object-based audio encodings, multi-channel stereo, etc. in various embodiments). In some embodiments, when provided with a particular performance script, the performance module will always produce the same output.

An analytics module, in some embodiments, is a server-implemented module that receives feedback information and configures the composition module (e.g., in real-time, periodically, based on administrator commands, etc.). In some embodiments, the analytics module uses a combination of machine learning techniques to correlate user feedback with performance scripts and loop library metadata.

FIG. 8 is a block diagram illustrating an example music generator system that includes analysis and composition modules, according to some embodiments. In some embodiments, the system of FIG. 8 is configured to generate a potentially-infinite stream of music with direct user control over the mood and style of music. In the illustrated embodiment, the system includes analysis module 810, composition module 820, performance module 830, and audio output device 840. In some embodiments, analysis module 810 is implemented by a server and composition module 820 and performance module 830 are implemented by one or more client devices. In other embodiments, modules 810, 820, and 830 may all be implemented on a client device or may all be implemented server-side.

Analysis module 810, in the illustrated embodiment, stores one or more artist packs 812 and implements a feature extraction module 814, a client simulator module 816, and a deep neural network 818.

In some embodiments, feature extraction module 814 adds loops to a loop library after analyzing loop audio (although note that some loops may be received with metadata already generated and may not require analysis). For example, raw audio in a format such as way, aiff, or FLAC may be analyzed for quantifiable musical properties such as instrument classification, pitch transcription, beat timings, tempo, file length, and audio amplitude in multiple frequency bins. Analysis module 810 may also store more abstract musical properties or mood descriptions for loops, e.g., based on manual tagging by artists or machine listening. For example, moods may be quantified using multiple discrete categories, with ranges of values for each category for a given loop.

Consider, for example, a loop A that is analyzed to determine that the notes G2, Bb2, and D2 are used, the first beat begins 6 milliseconds into the file, the tempo is 122 bpm, the file is 6483 milliseconds long, and the loop has normalized amplitude values of 0.3, 0.5, 0.7, 0.3, and 0.2 across five frequency bins. The artist may label the loop as "funk genre" with the following mood values:

| Transcendence | Peacefulness | Power | Joy | Sadness | Tension |
|---|---|---|---|---|---|
| HIGH | HIGH | LOW | MEDIUM | NONE | LOW |

Analysis module 810 may store this information in a database and clients may download subsections of the information, e.g., as loop packages. Although artists packs 812 are shown for purposes of illustration, analysis module 810 may provide various types of loop packages to composition module 820.

Client simulator module 816, in the illustrated embodiment, analyzes various types of feedback to provide feedback information in a format supported by deep neural network 818. In the illustrated embodiment, the deep neural network 818 also receives performance scripts generated by composition modules as inputs. In some embodiments, the deep neural network configures the composition module based on these inputs, e.g., to improve correlations between types of generated music output and desired feedback. For example, the deep neural network may periodically push updates to client devices implementing composition module 820. Note that deep neural network 818 is shown for purposes of illustration and may provide strong machine learning performance in disclosed embodiments, but is not intended to limit the scope of the present disclosure. In various embodiments, various types of machine learning techniques may be implemented alone or in various combinations to perform similar functionality. Note that machine learning modules may be used to implement rule sets (e.g., arrangement rules or techniques) directly in some embodiments or may be used to control modules implementing other types of rule sets, e.g., using deep neural network 818 in the illustrated embodiment.

In some embodiments, analysis module 810 generates composition parameters for composition module 820 to improve correlation between desired feedback and use of certain parameters. For example, actual user feedback may be used to adjust composition parameters, e.g., to attempt to reduce negative feedback.

As one example, consider a situation where module 810 discovers a correlation between negative feedback (e.g., explicit low rankings, low volume listening, short listening times, etc.) and compositions that use a high number of layers. In some embodiments, module 810 uses a technique such as backpropagation to determine that adjusting probability parameters used to add more tracks reduces the frequency of this issue. For example, module 810 may predict that reducing a probability parameter by 50% will reduce negative feedback by 8% and may determine to perform the reduction and push updated parameters to the composition module (note that probability parameters are discussed in detail below, but any of various parameters for statistical models may similarly be adjusted).

As another example, consider a situation where module 810 discovers that negative feedback is correlated with the user setting mood control to high tension. A correlation between loops with low tension tags and users asking for high tension may also be found. In this case, module 810 may increase a parameter such that the probability of selecting loops with high tension tags is increased when users ask for high tension music. Thus, the machine learning may be based on various information, including composition outputs, feedback information, user control inputs, etc.

Composition module 820, in the illustrated embodiment, includes a section sequencer 822, section arranger 824, technique implementation module 826, and loop selection module 828. In some embodiments, composition module 820 organizes and constructs sections of the composition based on loop metadata and user control input (e.g., mood control).

Section sequencer 822, in some embodiments, sequences different types of sections. In some embodiments, section sequencer 822 implements a finite state machine to continuously output the next type of section during operation. For example, composition module 820 may be configured to use different types of sections such as an intro, buildup, drop, breakdown, and bridge, as discussed in further detail below with reference to FIG. 10. Further, each section may include multiple subsections that define how the music changes throughout a section, e.g., including a transition-in subsection, a main content subsection, and a transition-out subsection.

Section arranger 824, in some embodiments, constructs subsections according to arranging rules. For example, one rule may specify to transition-in by gradually adding tracks. Another rule may specify to transition-in by gradually increasing gain on a set of tracks. Another rule may specify to chop a vocal loop to create a melody. In some embodiments, the probability of a loop in the loop library being appended to a track is a function of the current position in a section or subsection, loops that overlap in time on another track, and user input parameters such as a mood variable (which may be used to determine target attributes for generated music content). The function may be adjusted, e.g., by adjusting coefficients based on machine learning.

Technique implementation module 820, in some embodiments, is configured to facilitate section arrangement by adding rules, e.g., as specified by an artist or determined by analyzing compositions of a particular artist. A "technique" may describe how a particular artist implements arrangement rules at a technical level. For example, for an arrangement rule that specifies to transition-in by gradually adding tracks, one technique may indicate to add tracks in order of drums, bass, pads, then vocals while another technique may indicate to add tracks in order of bass, pads, vocals, then drums. Similarly, for an arrangement rule that specifies to chop a vocal loop to create a melody a technique may indicate to chop vocals on every second beat and repeat a chopped section of loop twice before moving to the next chopped section.

Loop selection module 828, in the illustrated embodiment, selects loops according to the arrangement rules and techniques, for inclusion in a section-by-section arranger 824. Once sections are complete, corresponding performance scripts may be generated and sent to performance module 830. Performance module 830 may receive performance script portions at various granularities. This may include, for example, an entire performance script for a performance of a certain length, a performance script for each section, a performance script for each sub-section, etc. In some embodiments, arrangement rules, techniques, or loop selection are implemented statistically, e.g., with different approaches used different percentages of the time.

Performance module 830, in the illustrated embodiment, includes filter module 831, effect module 832, mix module 833, master module 834, and perform module 835. In some embodiments, these modules process the performance script and generate music data in a format supported by audio output device 840. The performance script may specify the loops to be played, when they should be played, what effects should be applied by module 832 (e.g., on a per-track or per-subsection basis), what filters should be applied by module 831, etc.

For example, the performance script may specify to apply a low pass filter ramping from 1000 to 20000 Hz from 0 to 5000 milliseconds on a particular track. As another example, the performance script may specify to apply reverb with a 0.2 wet setting from 5000 to 15000 milliseconds on a particular track.

Mix module 833, in some embodiments, is configured to perform automated level control for the tracks being combined. In some embodiments, mix module 833 uses frequency domain analysis of the combined tracks to measure frequencies with too much or too little energy and applies gain to tracks in different frequency bands to even the mix. Master module 834, in some embodiments, is configured to perform multi-band compression, equalization (EQ), or limiting procedures to generate data for final formatting by perform module 835. The embodiment of FIG. 8 may automatically generate various output music content according to user input or other feedback information, while the machine learning techniques may allow for improved user experience over time.

FIG. 9 is a diagram illustrating an example buildup section of music content, according to some embodiments. The system of FIG. 8 may compose such a section by applying arranging rules and techniques. In the illustrated example, the buildup section includes three subsections and separate tracks for vocals, pad, drum, bass, and white noise.

The transition in subsection, in the illustrated example, includes a drum loop A, which is also repeated for the main content subsection. The transition in subsection also includes a bass loop A. As shown, the gain for the section begins low and increases linearly throughout the section (although non-linear increases or decreases are contemplated). The main content and transition-out subsection, in the illustrated example, include various vocal, pad, drum, and bass loops. As described above, disclosed techniques for automatically sequencing sections, arranging sections, and implementing techniques may generate near-infinite streams of output music content based on various user-adjustable parameters.

In some embodiments, a computer system displays an interface similar to FIG. 9 and allows artists to specify techniques used to compose sections. For example, artists may create structures such as shown in FIG. 9 which may be parsed into code for the composition module.

FIG. 10 is a diagram illustrating example techniques for arranging sections of music content, according to some embodiments. In the illustrated embodiment, a generated stream 1010 includes multiple sections 1020 that each include a start subsection 1022, development subsection 1024, and transition subsection 1026. In the illustrated example, multiple types of each section/subsection are show in tables connected via dotted lines. The circular elements, in the illustrated embodiment, are examples of arranging tools, which may further be implemented using specific techniques as discussed below. As shown, various composition decisions may be performed pseudo-randomly according to statistical percentages. For example, the types of subsections, the arranging tools for a particular type or subsection, or the techniques used to implement an arranging tool may be statistically determined.

In the illustrated example, a given section 1020 is one of five types: intro, buildup, drop, breakdown, and bridge, each with different functions that control intensity over the section. The state sub-section, in this example, is one of three types: slow build, sudden shift, or minimal, each with different behavior. The development sub-section, in this example, is one of three types: reduce, transform, or augment. The transition sub-section, in this example, is one of three types: collapse, ramp, or hint. The different types of sections and subsections may be selected based on rules or may be pseudo-randomly selected, for example.

In the illustrated example, the behaviors for different subsection types are implemented using one or more arranging tools. For a slow build, in this example, 40% of the time a low pass filter is applied and 80% of the time layers are added. For a transform development sub-section, in this example, 25% of the time loops are chopped. Various additional arranging tools are shown, including one-shot, dropout beat, apply reverb, add pads, add theme, remove layers, and white noise. These examples are included for purposes of illustration and are not intended to limit the scope of the present disclosure. Further, to facilitate illustration, these examples may not be complete (e.g., actual arranging may typically involve a much larger number of arranging rules).

In some embodiments, one or more arranging tools may be implemented using specific techniques (which may be artist specified or determined based on analysis of an artist's content). For example, one-shot may be implemented using sound-effects or vocals, loop chopping may be implemented using stutter or chop-in-half techniques, removing layers may be implemented by removing synth or removing vocals, white noise may be implemented using a ramp or pulse function, etc. In some embodiments, the specific technique selected for a given arranging tool may be selected according to a statistical function (e.g., 30% of the time removing layers may remove synths and 70% of the time it may remove vocals for a given artist). As discussed above, arranging rules or techniques may be determined automatically by analyzing existing compositions, e.g., using machine learning.

EXAMPLE METHODS

Figure 11:
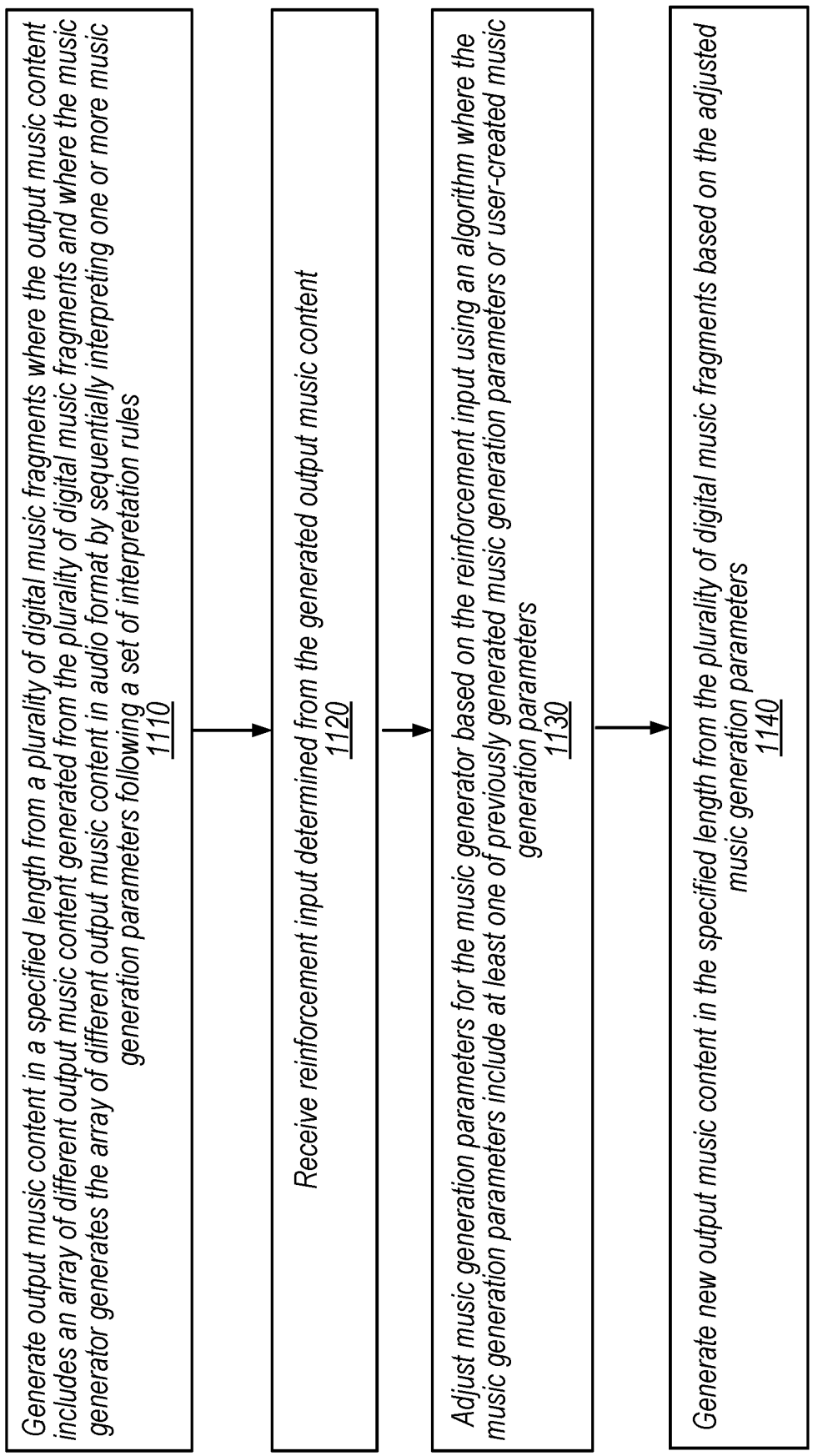
FIG. 11 is a flow diagram method for training a music generating system, according to some embodiments.

FIG. 11 is a flow diagram method for training a music generating system, according to some embodiments. The method shown in FIG. 11 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1110, in the illustrated embodiment, a music generator on a computer system generates output music content in a specified length from a plurality of digital music fragments where the output music content includes an array of different output music content generated from the plurality of digital music fragments and where the music generator generates the array of different output music content in audio format by sequentially interpreting one or more music generation parameters following a set of interpretation rules.

At 1120, in the illustrated embodiment, the music generator receives reinforcement input determined from the generated output music content.

At 1130, in the illustrated embodiment, music generation parameters for the music generator are adjusted based on the reinforcement input using an algorithm where the music generation parameters include at least one of previously generated music generation parameters or user-created music generation parameters.

At 1140, in the illustrated embodiment, new output music content in the specified length is generated from the plurality of digital music fragments based on the adjusted music generation parameters.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method, comprising:
    generating, by a music generator on a computer system, output music content from a plurality of digital music fragments, wherein the output music content includes an array of different output music content generated from the plurality of digital music fragments, and wherein the music generator generates the array of different output music content in audio format by sequentially interpreting one or more music generation parameters following a set of interpretation rules;
    receiving, by the music generator, reinforcement input determined from the generated output music content;
    adjusting, using an algorithm, at least one of the one or more music generation parameters for the music generator based on the reinforcement input, wherein the one or more music generation parameters include at least one of previously generated music generation parameters or user-created music generation parameters; and
    generating new output music content from the plurality of digital music fragments based on the adjusted at least one of the one or more music generation parameters.

2. The method of claim 1, further comprising classifying, by a classifier on the computer system, the output music content using a set of one or more trained classifiers to determine a prediction of a source of the music.

3. The method of claim 2, wherein the reinforcement input is determined based on the predictions determined by the classifier.

4. The method of claim 2, wherein determining the prediction includes determining a probability that the output music content has been generated by the music generator, and wherein the reinforcement input corresponds to the probability.

5. The method of claim 2, further comprising classifying, by the classifier, the output music content using an additional set of one or more trained classifiers to determine predictions of one or more artists associated with the output music content.

6. The method of claim 1, wherein the reinforcement input includes binary input to the algorithm, the binary input being a determination of whether the output music content satisfies a listening threshold.

7. The method of claim 6, further comprising receiving the binary input as human input on the output music content.

8. The method of claim 1, wherein the one or more music generation parameters in the music generator are implemented by a trained machine learning algorithm.

9. The method of claim 1, wherein adjusting the at least one of the one or more music generation parameters for the music generator includes adjusting the at least one of the one or more music generation parameters such that the music generator generates more human-like output music content.

10. The method of claim 1, wherein the one or more music generation parameters are parameters that control selection and processing of the music fragments.

11. A non-transitory computer-readable medium having instructions stored thereon that are executable by a computing device to perform operations comprising:
    generating, by a music generator, output music content in a specified length from a plurality of digital music fragments, wherein the output music content includes an array of different output music content generated from the plurality of digital music fragments, and wherein the music generator generates the array of different output music content in audio format by sequentially interpreting one or more music generation parameters following a set of interpretation rules;
    receiving, by the music generator, reinforcement input determined from the generated output music content;
    adjusting, using an algorithm, at least one of the one or more music generation parameters for the music generator based on the reinforcement input, wherein the one or more music generation parameters include at least one of previously generated music generation parameters or user-created music generation parameters; and
    generating new output music content in the specified length from the plurality of digital music fragments based on the adjusted at least one of the one or more music generation parameters.

12. The non-transitory computer-readable medium of claim 11, further comprising classifying, by a classifier, the output music content using a set of one or more trained classifiers to determine a prediction of whether the output music content has been generated by the music generator or by a human composer.

13. The non-transitory computer-readable medium of claim 11, wherein adjusting the at least one of the one or more music generation parameters for the music generator includes adjusting the at least one of the one or more music generation parameters such that the music generator generates output music content with human-like composition.

14. The non-transitory computer-readable medium of claim 11, wherein the one or more music generation parameters are parameters that control selection and processing of the music fragments, the processing of music fragments including applying various music controls to the output music content.

15. The non-transitory computer-readable medium of claim 14, wherein the music controls control one or more of the following audio properties: gain, high pass cutoff, low pass cutoff, reverb send level, reverb length, delay level, delay time, bass, beats, pads, tops, melodies, backing melodies, chords, and effects.

16. The non-transitory computer-readable medium of claim 11, wherein adjusting the at least one of the one or more music generation parameters for the music generator includes providing a binary input to the algorithm, the binary input being a prediction of whether the output music content satisfies a listening threshold.

17. An apparatus, comprising:
one or more processors, at least one processor being associated with a music generator implementing at least one algorithm; and
one or more memories having program instructions stored thereon that are executable by the one or more processors to:
generate, by the music generator, output music content in a specified length from a plurality of digital music fragments, wherein the output music content includes an array of different output music content generated from the plurality of digital music fragments, and wherein the music generator generates the array of different output music content in audio format by sequentially interpreting one or more music generation parameters following a set of interpretation rules;
receive, by the music generator, reinforcement input determined from the generated output music content;
adjust, using the algorithm, at least one of the one or more music generation parameters for the music generator based on the reinforcement input, wherein the one or more music generation parameters include at least one of previously generated music generation parameters or user-created music generation parameters; and
generate new output music content in the specified length from the plurality of digital music fragments based on the adjusted at least one of the one or more music generation parameters.

18. The apparatus of claim 17, wherein at least one processor includes a classifier, additional program instructions being executable by the classifier to determine whether music content is generated by a human composer or generated by the music generator.

19. The apparatus of claim 18, wherein the reinforcement input is determined, at least in part, based on the determination of whether music content is generated by a human composer or generated by the music generator.

20. The apparatus of claim 17, wherein the reinforcement input includes binary input to the algorithm, the binary input being a determination of whether the output music content satisfies a listening threshold determined by a human.

* * * * *